(12) United States Patent
Wang et al.

(10) Patent No.: US 9,436,780 B2
(45) Date of Patent: Sep. 6, 2016

(54) CONSTRUCTING INCREMENTAL TREE MODEL FOR VEIN IMAGE RECOGNITION AND AUTHENTICATION

(75) Inventors: Jinjun Wang, San Jose, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 833 days.

(21) Appl. No.: 13/545,820

(22) Filed: Jul. 10, 2012

(65) Prior Publication Data
US 2014/0019489 A1 Jan. 16, 2014

(51) Int. Cl.
*G06F 17/30* (2006.01)

(52) U.S. Cl.
CPC ... *G06F 17/30961* (2013.01); *G06F 17/30327* (2013.01)

(58) Field of Classification Search
CPC ............ G06F 17/30327; G06F 17/30539; G06F 17/30595; G06F 17/30923
USPC ................................. 707/797, 804, 786, 778
See application file for complete search history.

(56) References Cited

U.S. PATENT DOCUMENTS

| | | | |
|---|---|---|---|
| 5,864,839 A * | 1/1999 | Bourgoin | |
| 6,041,133 A | 3/2000 | Califano et al. | |
| 7,043,024 B1 | 5/2006 | Dinsmore et al. | |
| 7,680,748 B2 | 3/2010 | Heisele et al. | |
| 7,747,633 B2 | 6/2010 | Kadiyska et al. | |
| 2002/0193981 A1* | 12/2002 | Keung et al. | 704/1 |
| 2003/0069652 A1* | 4/2003 | Lee | 700/47 |
| 2005/0216445 A1* | 9/2005 | Rao | 707/3 |
| 2005/0273472 A1 | 12/2005 | Reddy et al. | |
| 2007/0058841 A1 | 3/2007 | Miura et al. | |
| 2007/0260568 A1* | 11/2007 | Perng et al. | 706/47 |
| 2010/0014655 A1 | 1/2010 | Chmora et al. | |
| 2010/0292101 A1* | 11/2010 | So | 506/16 |

OTHER PUBLICATIONS

Kaess, Michael, et al. "iSAM2: Incremental smoothing and mapping using the Bayes tree." The International Journal of Robotics Research (2011): 0278364911430419.*

Guttman, Antonin. R-trees: a dynamic index structure for spatial searching. vol. 14. No. 2. ACM, 1984.*

Hong, Tzung-Pei, Chun-Wei Lin, and Yu-Lung Wu. "Incrementally fast updated frequent pattern trees." Expert Systems with Applications 34.4 (2008): 2424-2435.*

Lee, J. J., "Efficient Object Recognition and Image Retrieval for Large-Scale Applications", Department of Electrical Engineering and Computer Science, Massachusetts Institute of Technology, May 2008.

* cited by examiner

*Primary Examiner* — Nan Hutton

(57) ABSTRACT

An indexed hierarchical tree search structure implements incremental tree modification to add new registrants to the tree without requiring reconstruction of the tree. Only data within a leaf node that receives new data is used in the incremental tree modification. Consequently, the original data set used in the creation of the hierarchical tree may be deleted after construction of the tree.

20 Claims, 26 Drawing Sheets

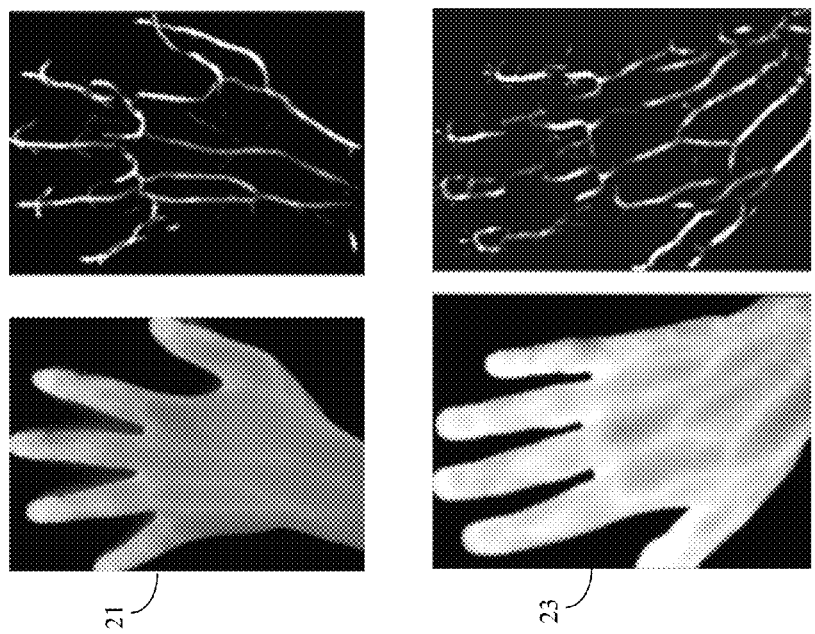
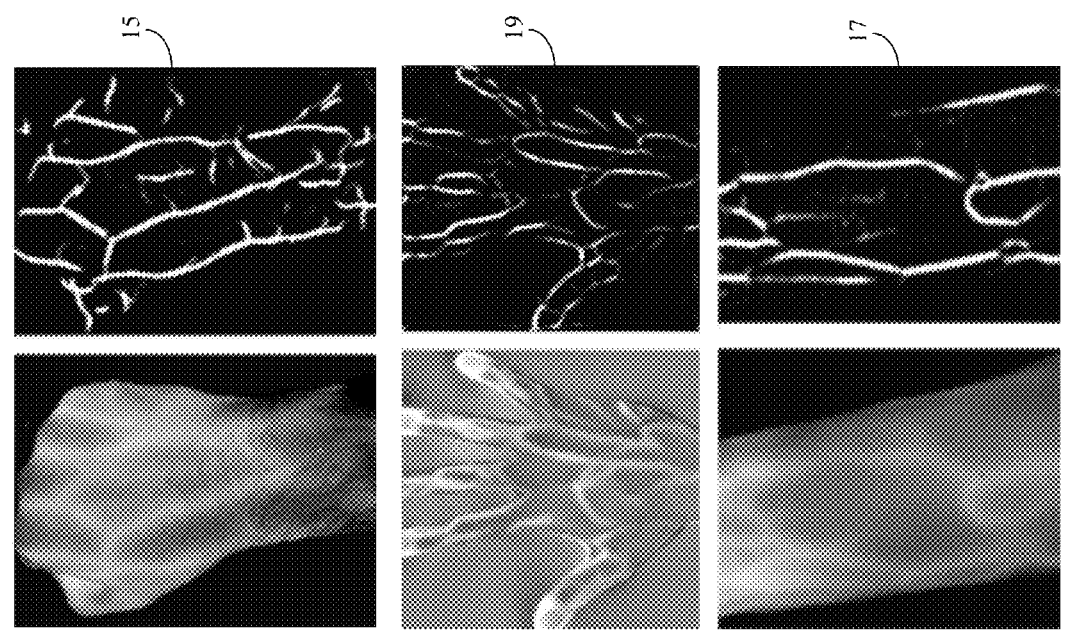
FIG. 2

Max votes must surpass a threshold to be considered an authorized user

METHOD 1
Step 1: Given an existing registered tree 51, obtain a set of feature descriptors 251 from a new registrant's registration image and assign a corresponding ID
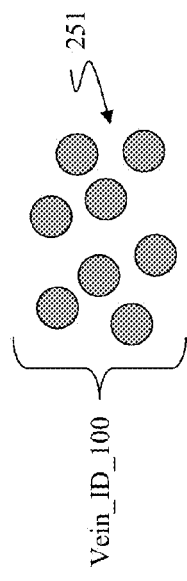
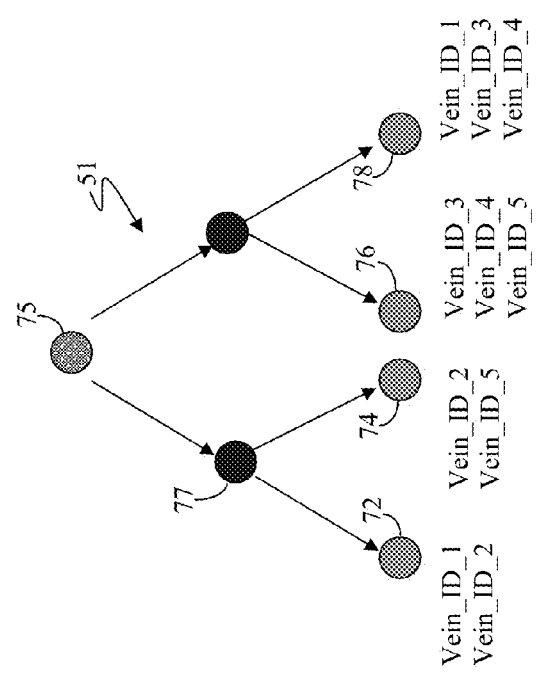
FIG. 19

METHOD 1

Step 2: Cluster (i.e. distribute) each of the new feature point descriptors into an existing leaf node of the pre-existing tree 51

Step 3: For each leaf node, if its original stopping condition is violated by the new feature descriptors (e.g. the max distance between any two feature descriptors is greater than a threshold), the tree's original splitting process is applied to further cluster the leaf (i.e. to create new child nodes under the existing leaf node)

Step 4: The finger ID list in the original leaf node 78 is duplicated to each of the new child nodes 261 and 263, each of which may constitute a new leaf node or may be further split into additional leaf nodes as determined by the tree's original splitting process.

METHOD 2
Step 1: Given an existing registered tree 51, obtain a set of feature descriptors 251 from a new registrant's registration image and assign a corresponding ID
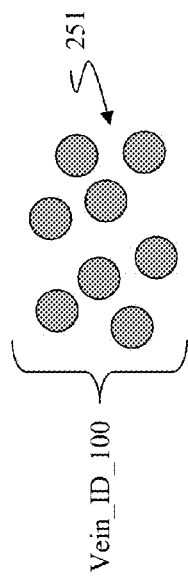
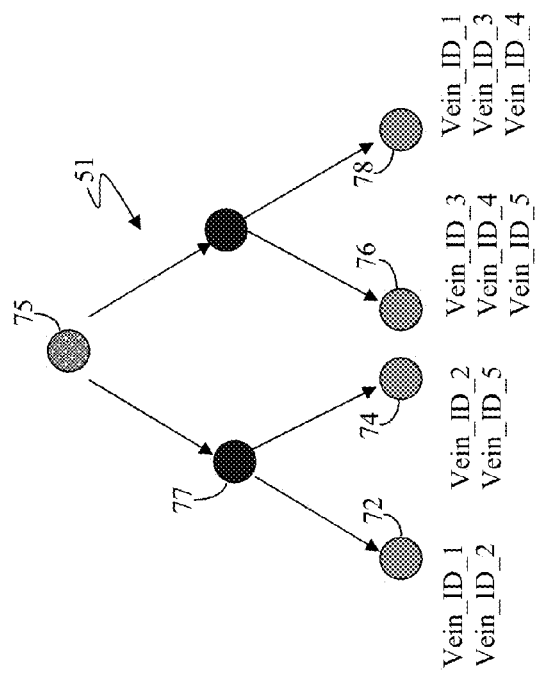
FIG. 23

METHOD 2

Step 2: Cluster (i.e. distribute) each of the new feature point descriptors into an existing leaf node of the pre-existing tree 51

Step 3: For each leaf node that received a new feature descriptor, the leaf node is split into two child nodes creating a sub-leaf-node_1 and a sub_leaf_node_2. Sub_leaf_node_1 is made a duplicate of the original leaf node 78 prior to receiving any of the new set of feature descriptors, and sub_leaf_node_2 receives all the new feature descriptors and any descriptor that violates the original stopping condition of the original leaf node 78 (e.g. the max distance to the original center is greater than twice the threshold).

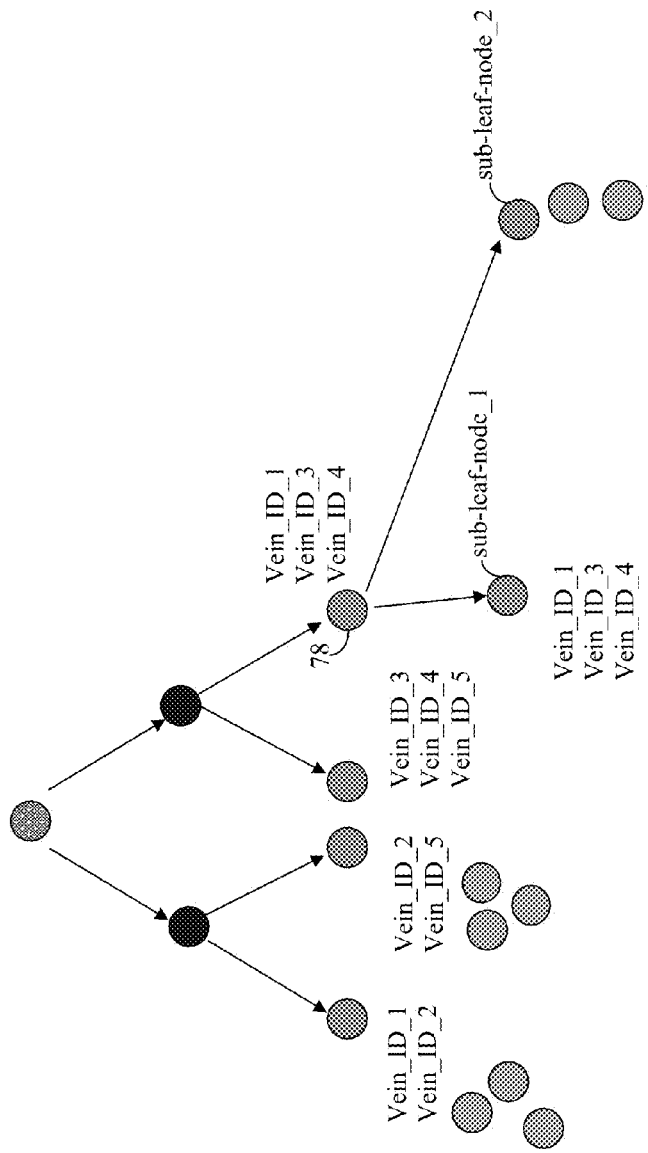

FIG. 25

Step 4: A splitting process (such as the original splitting process) is applied to sub_leaf_node_2 to further cluster (i.e. split) sub_leaf_node_2, resulting in two new leaf nodes 271 and 273.

CONSTRUCTING INCREMENTAL TREE MODEL FOR VEIN IMAGE RECOGNITION AND AUTHENTICATION

BACKGROUND

1. Field of Invention

The present invention generally relates to a biometric identification system. More specifically, the present invention relates to the incremental modification of hierarchically indexed features in an identification registration system.

2. Description of Related Art

Biometrics refers to the use of intrinsic human traits for personal identification purposes. That is, a person may be identified by one or a combination of multiple different personal trait characteristics of that person. Examples of such personal traits are a fingerprint, a hand print (length and thickness of the fingers, size of the hand itself), a retina scan (pattern of blood vessels in the eye), an iris scan, a facial photograph, a blood vessel pattern (vein pattern), a voice print, a dynamic signature (the shape and time pattern for writing a signature), or a keystroke pattern (key entry timing).

An example fingerprint biometrics for personal identification is illustrated in U.S. Pat. No. 6,041,133 to Califano et al., which illustrates the identification of distinguishing characteristics, or token, based on the shapes of fingerprints. The identified tokens are then organized in a suitable searching format. Examples of using a hierarchical tree to organize identifying tokens for purposes of object recognition using a voting method is illustrated in U.S. Pat. No. 7,680,748 to Heisele et al.

Of particular interest regarding the present invention, however, are biometric identification techniques that use blood vessels, or veins, for personal identification. A method for automatically identifying blood vessels in a diagnostic image is described in U.S. Pat. No. 7,343,032 and an example of a technique for obtaining diagnostic images of blood vessels from a human eye for personal identification (ID) purposes is shown in U.S. Pat. No. 6,569,104. Another example provided in U.S. Pub. No. 2010/0045788 describes the use of visible and near infrared light to acquire diagnostic images of a palm print image for personal identification. A technique for using vein authentication on a finger for identification purposes is described in U.S. Pub. No. 2010/0198078.

Various techniques are known for identifying specific pattern structures in diagnostic images. One technique for identifying blood vessel patterns is by means of path-based tree matching, such as described in U.S. Pat. No. 7,646,903. Tree matching algorithms require tree structures as input. This structure describes the tree as a series of branches interconnected through branch points. Several known algorithms can be used to obtain the tree structure including tracking, segmentation, and skeletonization. Once the tree structure is obtained, a matching algorithm operates directly on the structure and any data contained therein.

A difficulty associated with using a tree structure is that modification of an existing tree requires access to all the data used in its original construction. Thus, once a tree is constructed, it cannot easily be modified to accommodate a change in data. In a personal identification (ID) system, for example, once an initial group of persons are registered, it is not a straight forward problem to register a new person or to remove a person from registration. The new person's identification data needs to be incorporated into the existing hierarchical tree, but this would typically require that the existing tree be removed and replaced by a new tree constructed from the new individual's identification data plus the identification data of the previous group of registered persons. Similarly, if a person from the original group is to be removed from the registration list, the existing tree would typically be replaced by new tree constructed from the characteristic data of the remaining individuals in the registration list. This process is not optimal since it requires storing of all original characteristic data of all registered persons, which poses a security risk, and requires additional computation resources.

Methods have been proposed for incrementally modifying an existing hierarchical tree without having to reconstruct a new tree. Such an incremental approach is described in "Efficient Object Recognition and Image Retrieval for Large-Scale Applications", Thesis MIT 2008, ME of EECS by John Jaesung Lee. Such systems, however, still require access to all original data for identifying the tree nodes that need modification, and how to best modify the nodes. Such methods thus require access to additional information not available in the existing tree. Of more importance in the present application, existing incremental three methods cannot handle tree models having registration information.

It is an object of the present invention to provide an incremental tree method for tree models having registration information.

Another object of the present invention is to provide an efficient method of applying tree matching to biometric applications.

Another object of the present invention is to provide a hierarchical approach that not only identifies the closest matching vein pattern to a query, but also has the ability to reliability and efficiently reject a false positive identification.

SUMMARY OF INVENTION

A biometric identification system (such as finger vein recognition) typically makes use of a hierarchical tree constructed from a plurality of representative image patches (each representative image patch may correspond to a multiple IDed users). A separate representative image patch defines each of the hierarchical tree's leaf nodes, and a reverse index identifies the IDed users associated with each leaf node. Construction of the hierarchical tree requires gathering a collection of unique image patches from each IDed user, combining the unique image patches from all the IDed users into a collection of representative image patches, arranging the representative image patches into a hierarchical tree, and constructing an reverse index at each leaf node.

A problem arises when one wants to add a new IDed user to an existing hierarchical tree. Ideally, one would incorporate the new IDed user's unique image patches to the original collection of unique image patches, construct a new set of representative image patches, construct a new hierarchical tree, and create a new reverse index. But this means storing all the original unique image patches and index data for future use after construction of a hierarchical tree. This is not ideal because of security concerns and memory constraints. What is desired is way of incorporating a new user's unique image patches into an existing hierarchical tree of representative image patches without constructing a new hierarchical tree (i.e. what is needed is incremental tree updating).

Existing methods of incremental tree updating rely on having all original data available for identifying the tree nodes that need modification, and how to best modify the nodes. However for security reasons, it is herein preferred that the original unique image patches be deleted, and that a smaller number of representative image patches be retained.

The invention is a new method of incremental tree updating that provides better results than existing methods. This invention has applications beyond finger vein recognition since it may be applied to other hierarchical tree applications where incremental tree updating is desired.

More precisely, the above-listed objects are met in a method of creating an updatable search tree identifying a specific item within an item class, said method comprising: (a) accessing a collection of unique registrable item samples belonging to said item class, each registrable item sample being a representation of a different target item and having a unique identification (ID) code identifying its corresponding target item; (b) identifying a, separate and corresponding, registrable set of item descriptors for each of said registrable item samples; (c) creating a composite collection of item descriptors from the separate registrable sets of item descriptors into; (d) organizing said composite collection of item descriptors into a hierarchical tree structure according to relations in the item descriptors, each leaf node of said hierarchical tree being indexed according to its leaf index list, said leaf index list being comprised of the ID's of the target items corresponding to the item descriptors within the leaf node; (e) accessing a new registrable item having a unique identification (ID) code identifying its corresponding target item; (f) identifying a new registrable set of item descriptors for said new registrable item; (g) distributing the new registrable set of item descriptors into said hierarchical tree according to said relations in the item descriptors by which said hierarchical tree is organized, each leaf node of said hierarchical tree that receives any part of said new registrable set of item descriptors being a target leaf node, and each target leaf node being subjected to an incremental tree modification of said hierarchical tree using only the item descriptors within the target leaf node, said incremental tree modification creating at least two additional child nodes under said target leaf node, each of said additional child nodes being indexed to the ID's on its index list, said index list including at least the IDs of the target items corresponding to the item descriptors within it, the resultant modified hierarchical tree being said updatable search tree.

In this approach, step (c) may include eliminating said separate registrable sets from use in any subsequent method step.

Also in this approach, step (b) may include destroying said registrable item samples after creation of said registrable set of item descriptors to eliminate use of said registrable item samples from any subsequent method step.

Preferably, the incremental tree modification includes: (i) for each target leaf node, if its original stopping condition is violated by the new registrable set of item descriptors, the hierarchical tree's original splitting process is applied to the target leaf node to create said additional child nodes under the existing target leaf node; and (ii) the leaf index ID list in the target leaf node is duplicated in the index list of each of said additional child nodes.

This method may further included after step (ii): a step (iii) where any of the additional child nodes that violates the original stopping condition is further split into additional new child nodes as determined by the tree's original splitting process and the leaf index ID list in the target leaf node is duplicated in each of the index lists of the additional new child nodes.

Preferably, the hierarchical tree's original splitting process is based on whether the maximum distance between any two feature descriptors is greater than a predefined threshold.

Also contemplated is an incremental tree modification process that includes: (I) for each target leaf node, the target leaf node is split into two child nodes creating a sub-leaf-node_1 and a sub_leaf_node_2; (II) sub_leaf_node_1 is made a duplicate of the target leaf node prior to receiving any of the new registrable set of item descriptors; and (III) sub_leaf_node_2 receives only new registrable set of item descriptors that were clustered within the target leaf node and any other descriptor that violates the original stopping condition of the target leaf node; and (IV) applying a splitting process to sub_leaf_node_2 to further cluster sub_leaf_node_2, resulting in two new additional leaf nodes under sub_leaf_node_2.

In step (IV) of this approach, the splitting process is not applied to sub_leaf_node_1. Additionally in step (IV), the splitting process is the hierarchical tree's original splitting process.

Also preferably, the sub_leaf_node_2 omits a duplication of the leaf index list of the target leaf node.

Optionally, this method may further include after step (g): a step (h) of identifying a specific one of the unique registrable items by obtaining a new sample of said unique registrable item, identifying a new set of item descriptors for the new sample, distributing said new set of item descriptors into said hierarchical tree according to said relations in the item descriptors by which said hierarchical tree is organized, noting the ID codes of the leaf nodes that receive any part of said new set of item descriptors, identifying the ID code that is noted most often as a target ID code; and (i) identifying as said specific one of the unique registrable items, the registrable item corresponding to said target ID code.

The above objects are also met in a method of incremental hierarchical tree modification, comprising: (a) accessing an indexed hierarchical tree wherein each leaf node is indexed to a set of ID's identifying all items represented by any one of a collection of data within the leaf node, the ID's represented by each leaf node constituting an index list of the leaf node, said hierarchical tree being organized by pre-defined data relations among the data clustered within the hierarchical tree; (b) accessing a new registrable item having a unique identification (ID) code identifying its corresponding target item, said unique ID not being represented by any ID list of any leaf node of said hierarchical tree; (c) identifying a new registrable set of item descriptors for said new registrable item; (d) distributing the new registrable set of item descriptors into said hierarchical tree according to said data relations by which said hierarchical tree is organized, each leaf node of said hierarchical tree that receives any part of said new registrable set of item descriptors being a target leaf node, and each target leaf node being subjected to an incremental tree modification of said hierarchical tree using only the item descriptors within the target leaf node, said incremental tree modification creating at least two additional child nodes under said target leaf node, each of said additional child nodes being indexed to the ID's on its index list, said index list including at least the IDs of the target items corresponding to the item descriptors within it.

Preferably in this method, the incremental tree modification includes: (i) for each target leaf node, if its original stopping condition is violated by the new registrable set of item descriptors, the hierarchical tree's original splitting process is applied to the target leaf node to create said additional child nodes under the existing target leaf node; and (ii) the leaf index ID list in the target leaf node is duplicated in the index list of each of said additional child nodes.

This method may further include after step (ii): a step (iii) where any of the additional child nodes that violates the original stopping condition is further split into additional new child nodes as determined by the tree's original splitting process and the leaf index ID list in the target leaf node is duplicated in each of the index lists of the additional new child nodes.

Preferably, the hierarchical tree's original splitting process is based on whether the maximum distance between any two pieces of data is greater than a predefined threshold.

Further preferably, the incremental tree modification includes: (I) for each target leaf node, the target leaf node is split into two child nodes creating a sub-leaf-node_1 and a sub_leaf_node_2; (II) sub_leaf_node_1 is made a duplicate of the target leaf node prior to receiving any of the new registrable set of item descriptors; and (III) sub_leaf_node_2 receives only new registrable set of item descriptors that were clustered within the target leaf node and any other descriptor that violates the original stopping condition of the target leaf node; (IV) applying a splitting process to sub_leaf_node_2 to further cluster sub_leaf_node_2, resulting in two new additional leaf nodes under sub_leaf_node_2.

Preferably in step (IV), the splitting process is not applied to sub_leaf_node_1.

Additionally in step (IV), the splitting process is the hierarchical tree's original splitting process.

Furthermore, the sub_leaf_node_2 omits a duplication of the leaf index list of the target leaf node.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 2 shows various types of vein maps as examples of item classes.

FIGS. 19-22 illustrate various steps in a first method (Method 1) of incremental tree modification using only data within (an associated via an index list, to) any given leaf node.

FIGS. 23-26 illustrate various steps in a second method (Method 2) of incremental tree modification using only data within (an associated via an index list, to) any given leaf node.

DESCRIPTION OF THE PREFERRED EMBODIMENTS

Figure 1:
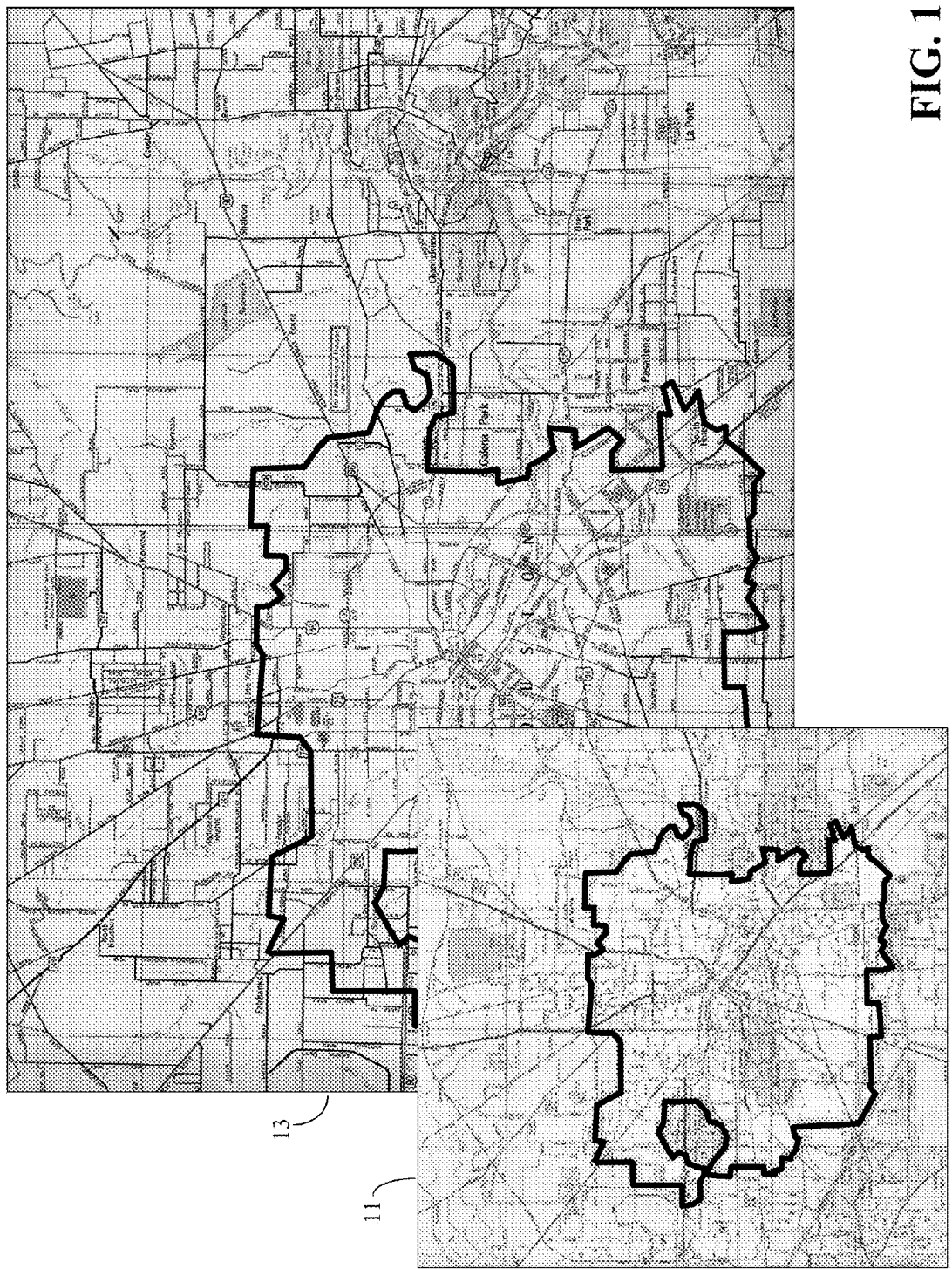
FIG. 1 shows street maps as an example of an item class.

People have many distinctive and personal characteristics that distinguish one person from another. Some examples of these distinguishing characteristics are fingerprints, facial features, vein (or blood vessel) patterns in various parts of the body, voice point, etc. The use of one (or a combination of) such distinguishing characteristics, or traits, to identify (or to verify the identity of) someone is termed Biometrics.

Biometrics thus involves receiving a test sample of a biometric feature, such as a finger print, and comparing the test sample with a registry of known (i.e. pre-registered) samples in an effort to find a match. Typically, the registry is built by registering known individuals. Each registering individual submits a true sample of a specific biometric feature, which then becomes his registered sample and is identified with that individual. In this manner, the registered sample is known to correspond to (i.e. is registered to) a specific individual, and a person's identity can be confirmed by matching his/her newly submitted test sample(s) to his/her registered sample(s).

In the typical biometric identification process, a submitted test sample of someone wishing to be identified (i.e. authenticated or verified) as a registered person is compared with a registry of registered samples. If a match is found, then the test sample is identified as corresponding to the registered person associated with the matched registered sample. If the person is not already registered within the registry of biometric samples, then the process should reject the person as unknown and not verified. Thus, the biometric identification process should only authenticate (i.e. recognize) registered persons. Much research has been made into various methods of precisely matching a submitted test sample to a library of registered sample, and avoiding false positives (i.e. erroneously authenticating a non-registered person).

Problems may arise when a test sample submitted for recognition is truly from a registered person, but the test sample is not identical to the registered person's registered sample due to various circumstances. For example, the testing device that acquires the test sample may not be as precise as (or may otherwise be different or provide a different, or partial, view as compared to) the device used to originally register the person. Variations may also be due to physiological changes in the registered person that cause his/her test sample to vary to some degree from the registered sample (i.e., the true sample previously used to register the person). In this case, the biometric algorithm should be flexible enough to allow for such variations, but still be sophisticated enough to avoid mistakenly verifying a person that is not in the registry.

Such sophisticated systems can be slow to process submitted test samples, which is a problem since biometric identification devices are often used to control access to specific buildings, rooms, devices, and/or information, and an unduly long delay in verification can significantly disrupt workflow.

Biometric systems can be sped up by creating special searching algorithms based on the library of registered samples, themselves. Because these special searching algorithms have search parameters specifically tailored to the registered samples, they can be made to execute faster than a general search mechanism. However, because these special search algorithms are tailor-made to the library of registered samples, they need to be reconstructed whenever the library of registered samples is changed. That is, if a new person is added to the registry (or a previously registered person is removed from the registry), a new tailor-made search model needs to be constructed to reflect the current state of the registry, and this new search algorithm then needs to be distributed to all biometric identification devices.

Attempting to avoid reconstructing a special search algorithm by simply modifying an existing special search algorithm to accommodate a change in the registry would typically render less than satisfactory results, and increase the probability of false positive and false negative authentications. The present invention, however, provides a method for modifying an existing search model (more specifically a hierarchical tree model) without unduly affecting the probability of false positive and false negative authentications.

In a preferred embodiment, a group of persons may be registered by first submitting their personal biometric sample(s). If more then one type of biometric sample is provided, each may be analyzing separately or together, and the analysis results may then be organized into an easy to search format. Preferably, this search format is based on a hierarchical tree model (i.e. structure). Analysis may include identifying characteristic features (or sample values of categories of features) in the biometric samples, and organizing these characteristic features into the search model. For example, if the biometric samples being used for authentication are finger vein patterns, then a specified number of distinguishing features are identified and categorized (or grouped) for each of the real-world finger vein patterns, and these categories are then organized into an easy to search format. When a person is registered, his/her specific number of distinguishing features (identified from his/her submitted biometric sample) are sorted by similarity.

Verification of a registered person is a similar process of receiving a person's test sample, identifying the specific number of distinguishing features in the test sample, and identifying which categories these distinguishing features would sort into by similarity. Each identified category would list the identifications (ID's) of the registered persons who are represented in that category (i.e. whose registered samples have some distinguishing feature sorted into that category). By noting the ID that is found most often in the categories into which the test sample is sorted, one can identify a matching registered sample as a candidate for authentication.

Although the present invention is described as applied to biometric identification method, it is to be understood that it is equally applicable to other applications where a hierarchical tree is changed incrementally and/or other types of authentication/search applications.

That is, it may be used in search applications of any given class type. For example with reference to FIG. 1, if the class type is a street map, which may be updated to reflect changes in city layout and/or road construction, a typical search application may be to quickly find a match between a portion of a small street map 11, with a corresponding portion in a larger street map 13. The present invention may be used to incorporate street map changes without requiring reconstruction of the existing organization of data.

In a preferred embodiment, however, the present invention is described as applied to a vein distribution map, but it is to be understood that it may be equally applied to other search applications and other types of biometric identification features, such as fingerprints, hand prints, a retina scans, iris scans, a facial photographs, blood vessel patterns, voice prints, dynamic signatures, keystroke patterns, etc.

For illustration purposes, FIG. 2 provides some examples of vein distribution maps. Vein maps of the back of a fist 15 and an arm 17 are shown. Also shown are three examples 19-21 of vein maps of the back of hands. As is self-evident, there are general similarities between the three human hand vein maps 19-21, but each is still distinguishable from all others. Thus, general categories of distinguishing features for a given type of biometric sample may be defined, but the combination of individual, distinguishing features obtained from a person's biometric sample (as sorted into the defined categories) may still be used to identify an individual.

Since the present invention is illustrated as applied to vein maps, and since maps may be in the form of vein map images, a first topic of discussion is how to identify a specific number of distinguishing features from a given image sample. It may therefore be beneficial to first address some aspects of image processing and computer vision, particularly in the areas of feature detection and feature extraction.

In the field of computer vision, correspondence matching refers to the matching of objects (or object features or feature points or descriptors) common to two, or more, images. Correspondence matching tries to figure out which parts of a first image corresponds to (i.e. are matched to) which parts of a second image, assuming that both are true images of a command subject taken at different times and/or from different view points. For example, the first image may be of a real-world scene taken from a first view angle with a first field of vision, FOV, and the second image may be of the same scene taken from a second view angle with a second FOV. Assuming that the first and second FOVs at least partially overlap, correspondence matching refers to the matching of common feature points in the overlapped portions of the first and second images.

Thus, the subject of feature based correspondence matching in images (and in particular, the subject of how to identify characteristic feature points of specific objects within an image for the purposes of corresponding matching) is relevant to the present discussion. One example of a feature based correspondence matching algorithm is the scale-invariant feature transform, SIFT. The SIFT transform (or algorithm or process) identifies points of interest (or feature points or item descriptors) in a 2D image.

A more detailed discussion of the SIFT transform is provided in U.S. Pat. No. 6,711,293 to Lowe, herein incorporated in its entirety by reference. When used in object recognition, the SIFT transform would use a library of training images to identify feature points (i.e. pixels in an image) that are characteristic of a specific type of object (or item class). Once a library of the object's characteristic feature points have been identified, the feature points may be used to determine if an instance of the same type of object is found in a newly received image. Principally, feature points (i.e. item descriptors) of the object item are extracted to provide a "feature description". This feature description can then be used to search for examples of the specific object item in a test image containing many object-types. To perform reliable recognition, it is preferred that the features extracted from the training images be detectable under changes in image scale, noise, illumination, and rotation. To reduce the contribution of the errors caused by local variations in the average error of all feature matching errors, SIFT typically detects and uses a large number of feature points from the images.

In a typical SIFT application, feature points are first extracted from a set of training images and stored in a database. An object is recognized in a new image by individually comparing each feature point from the new image to this database and finding candidate matching features based on Euclidean distance of their feature point vectors. From the full set of matches, subsets of feature points that agree on the type of object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object item is computed, given the accuracy of fit and number of probable false matches. Object item matches that pass all these tests can be identified as correct.

Figure 3:
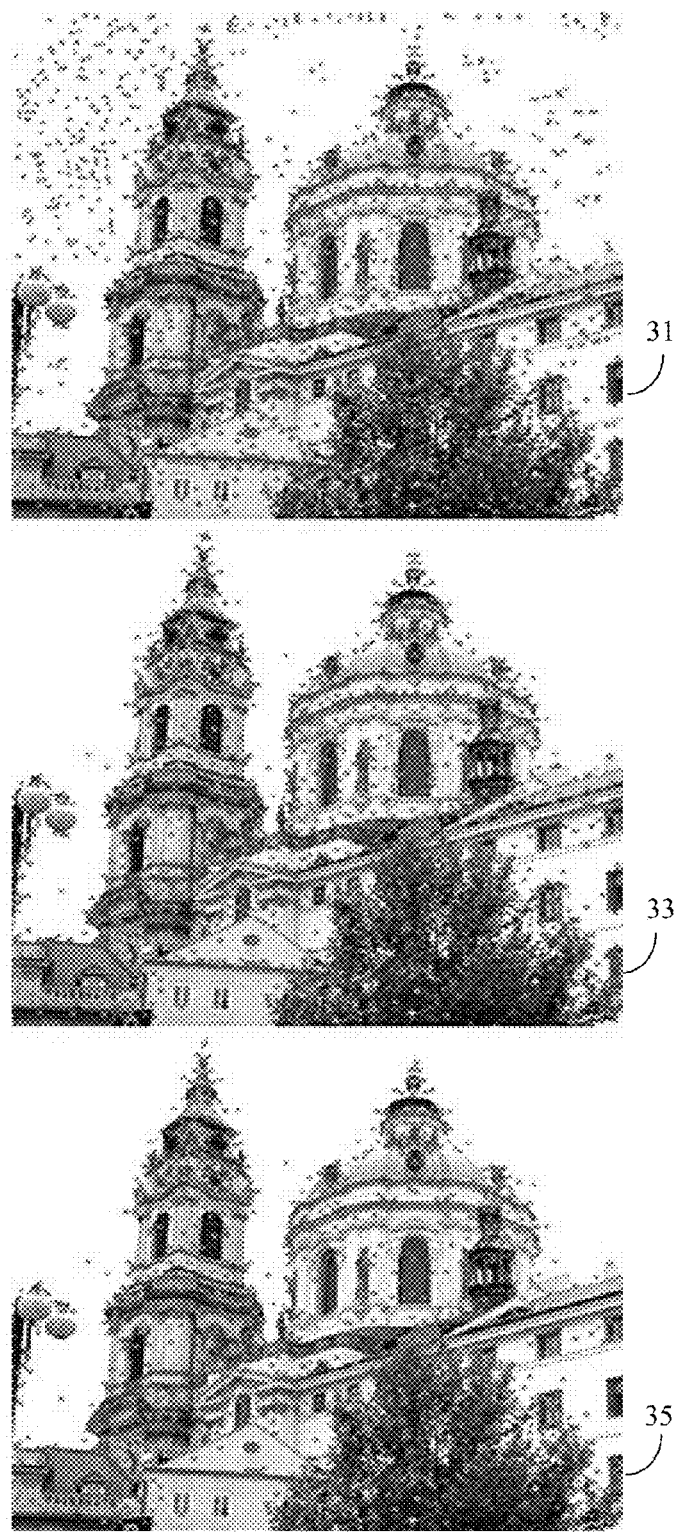
FIG. 3 illustrates the identification of item descriptors in an image using a SIFT transform.

Identification of feature points is of particular interest to the present invention. An example of a SIFT determination of feature points is illustrated in FIG. 3. Feature points usually lie near high-contrast regions of an image. Possible feature points are first identified, as indicated by dark dots in image 31. Possible feature points that have a low contrast are then discarded, as illustrate in image 33. Finally, possible features points located on edges are removed, which leaves the final set of feature points shown in image 35.

The present invention, however, does not make use of SIFT's ability to correlate similar objects in multiple images. Of more interest to the present invention is the identification of item descriptors (i.e., the feature points or SIFT descriptors) provided by the SIFT transform.

Since an objective of SIFT's algorithm is to identify similar item descriptors in two, or more, images, it is clear that each item descriptor needs to be highly distinguishable from others. This is achieved in the number of descriptive characteristics (or descriptive data) used to identify each item descriptor. In a typical SIFT transform, each item descriptor is typically characterized by 128 pieces of descriptive data. That is, each item descriptor (i.e. pixel point in the present example) may be thought of as a 128-dimension vector. The present invention uses SIFT only to identify item descriptors within an image, and then uses the identified sets of items descriptors in its registration and identification processes. It is to be understood however, that other methods of identifying item descriptors may be used without deviating from the present invention.

Figure 4:
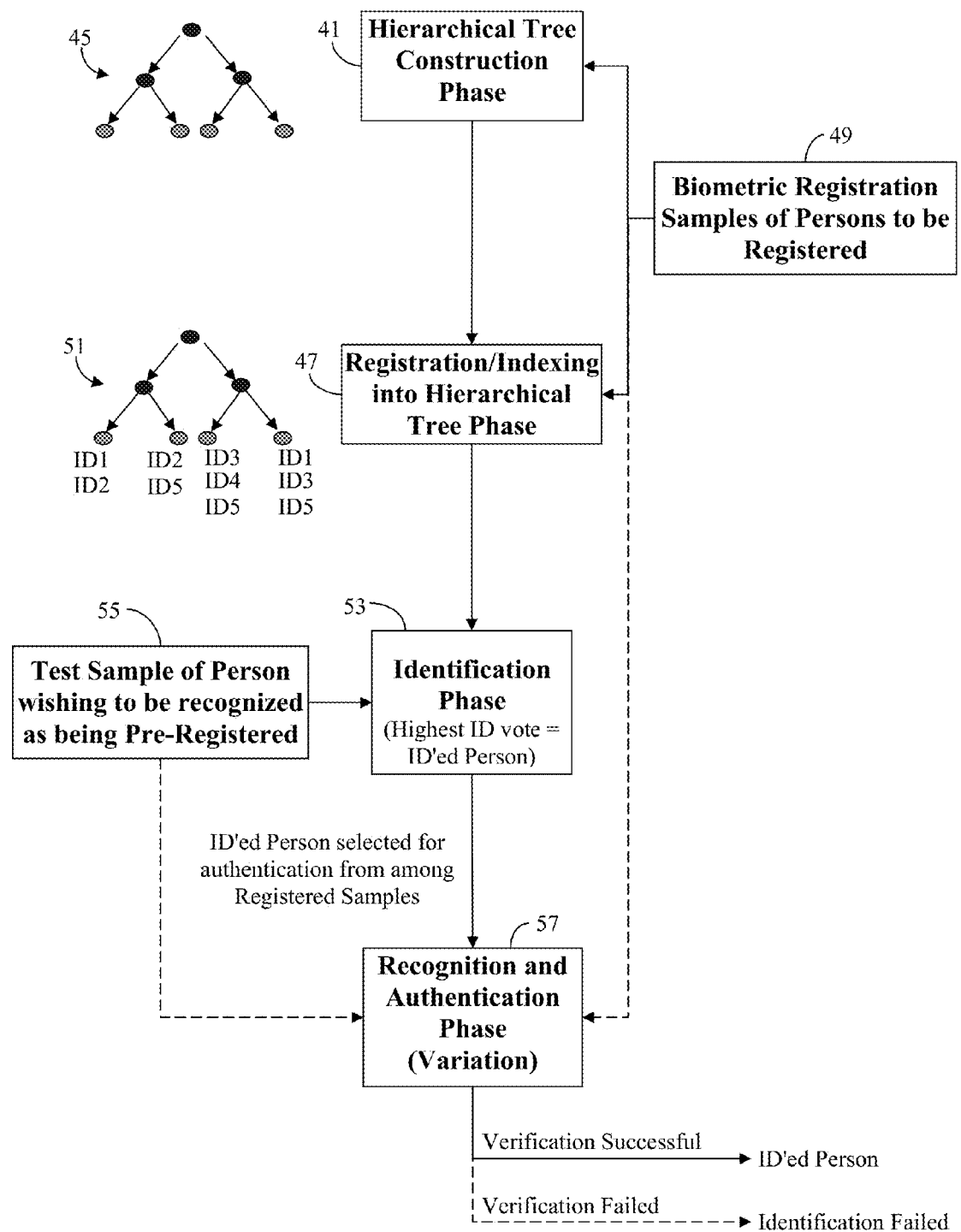
FIG. 4 provides a general overview (project flow) of the present invention.

A general overview of a hierarchical tree construction phase 41, registration/indexing phase 47, and identification phase 53 in accord with the present embodiment is illustrated in FIG. 4. Both the hierarchical tree construction phase 41 and registration/indexing phase 47 make use of the same set of biometric registration samples 49 (i.e. registrable item samples). Preferably, the set of biometric registration samples 49 is comprised of a plurality of biometric samples (for example, image samples) of each person to be registered, and each registration sample includes an identification (ID) code identifying (i.e. indexed to) its corresponding person. When used with hierarchical tree construction phase 41, the set of biometric registration samples 49 serve as a training library for identifying and organizing characteristic features of the particular biometric type into a sorting tree structure. When use in registration/indexing phase 47, the set of biometric registration samples 49 serve to index leaf nodes of the hierarchical tree specific individuals. In a sense, registration/indexing phase 47 attaches a probability measure to each leaf node, which indicates the probability of a registered person having some of his/her characteristic feature(s) sorted into that leaf node.

Hierarchical tree construction phase (or training phase) 41 preferably uses a SIFT application (or some other feature identification method) to identify a separate set of item descriptors for each image in the set of biometric registration samples 49. As is explained above, SIFT identifies as set of item descriptors for each image, and each item descriptor includes 128 pieces of descriptive data. The item descriptors of all the training images are then collected into a composite collection of item descriptors, and this composite collection is organized into a hierarchical tree structure according to relations (i.e. similarities) in the item descriptors. For example, these relations may be established by a k-means process, recursive k-means process, EM optimization process, agglomerative process, or other data clustering process. For illustrative purposes, a simplified hierarchical tree 45 having only 7 nodes (including 4 leaf nodes) is shown as the output from hierarchical tree construction phase 41. In the present example, each of the leaf nodes would correspond to a group of item descriptors sharing some common relation, i.e., having some similar characteristic(s).

Following hierarchical tree construction phase 41 is the registration/indexing phase 47, which uses the same set of biometric registration samples 49 to index hierarchical tree 45 to registered persons. That is, biometric registration samples 49 (i.e. registrable item samples) of each person to be registered are submitted to registration/indexing phase block 47. Each registration sample includes an identification (ID) code identifying its corresponding person. Registration/indexing phase 47 preferably uses the same feature identification technique used by hierarchical tree construction phase block 47 (i.e. SIFT in the present example) to identify a separate, and corresponding, registrable set of item descriptors for each registration sample. Due to the intricacies of the SIFT algorithms, the registrable set of item descriptors identified by registration/indexing phase 47 are not necessarily the same as (i.e., not identical to) those identified by hierarchical tree construction phase 41. However as before, the SIFT application in registration/indexing phase 47 identifies item descriptors for each registration sample (for example, for each registrable vein map image), and each item descriptor includes 128 pieces of descriptive data. Registration/indexing phase 47 then distributes the registrable sets of item descriptors into hierarchical tree 45 according to the relations in the item descriptors established in the creation of hierarchical tree 45. That is, the registrable sets of item descriptors are preferably distributed using the same data clustering technique used by hierarchical tree construction phase 41. Each leaf node that receives any part of a registrable set of item descriptors also receives the ID code of (i.e. is indexed to) the registered person to which the registrable set of item descriptors corresponds, which results in an index hierarchical tree.

A simplified illustration of an index hierarchical tree 51 as produced by registration/indexing phase 47 is shown in FIG. 4. Each leaf node that receives any item descriptor is assigned the ID code of the registered person to which the received item descriptor belongs. In the present example, five ID's (i.e. ID1, ID2, ID3, ID4, ID5) corresponding to five registered persons is shown.

With registration phase thus completed, the system flows to the identification phase (or identification phase block) 53, and is now ready to be used to identify a registered person by submission of a test sample. For example, a test sample 55 (i.e. a test biometric sample) of a person wishing to be recognized as being pre-registered is submitted to identifying phase block 53. Like before, identification phase block 53 preferably uses the SIFT application (or other feature identification method) used by registration phase block 47 to identify a test set (i.e. a specific set) of test item descriptors for the test sample. As before, the SIFT application identifies item descriptors for each test sample, and each item descriptor preferably includes 128 pieces of descriptive data. Identification phase block 53 then distributes the test set of item descriptors into index hierarchical tree 51.

The ID codes of the leaf nodes that receive any part of the test set of item descriptors are noted. In effect each noted ID code is a vote for that ID code's corresponding registered person. The ID code that is noted most often (i.e. the ID code that received the most votes) may be deemed a target ID code, since it refers to the registered person that most closely matches the test sample. However, because the present method is based on voting, identification phase block 53 always identifies a target ID code since it merely identifies the ID code that receives the most votes. Thus, identification phase block 53 is will issue a target ID code even if the test sample 55 is from a person that is not pre-registered. Therefore, the target ID code (i.e., the potentially ID'ed person) selected from among the registered samples is preferably submitted to a verification phase (or verification phase block) 57.

Verification phase block 57 then more carefully checks if the ID'ed person does indeed match the submitted test sample 55. If verification phase block 57 confirms that the ID'ed person does indeed correspond to the submitted test sample 55 (i.e. verification is successful), then the ID'ed person is issued as the registered person ID'ed as corresponding to test sample 55. If verification phase block 57 deems that the ID'ed person does not correspond to the submitted test sample 55 (i.e. verification failed) then it may issue a message stating that the identification failed, and the person who submitted test sample 55 is not recognized as being a registered person.

Verification phase bock 57 may achieve this in a number of ways, described in more detail below. For example, it may access the test sample and directly compare it to the full registration sample corresponding to the ID'ed person, as illustrated by dotted lines. This may use more traditional image comparison techniques. Alternatively, it may compare the number of votes of the target ID code to the number of votes received by the ID code that received the next-most number of votes. If the difference in votes is greater than a predefined threshold, then the target ID code may be confirmed as verified (i.e. verification successful), otherwise verification may be deemed to have failed (i.e. verification failed).

The hierarchical tree construction phase 41 is described in more detail in FIGS. 5 to 9. The main idea is to cluster feature data hierarchically in a tree structure using a method such as k-means or canopy clustering to create a fast inverted index for use in recognition and authorization applications.

Figure 5:
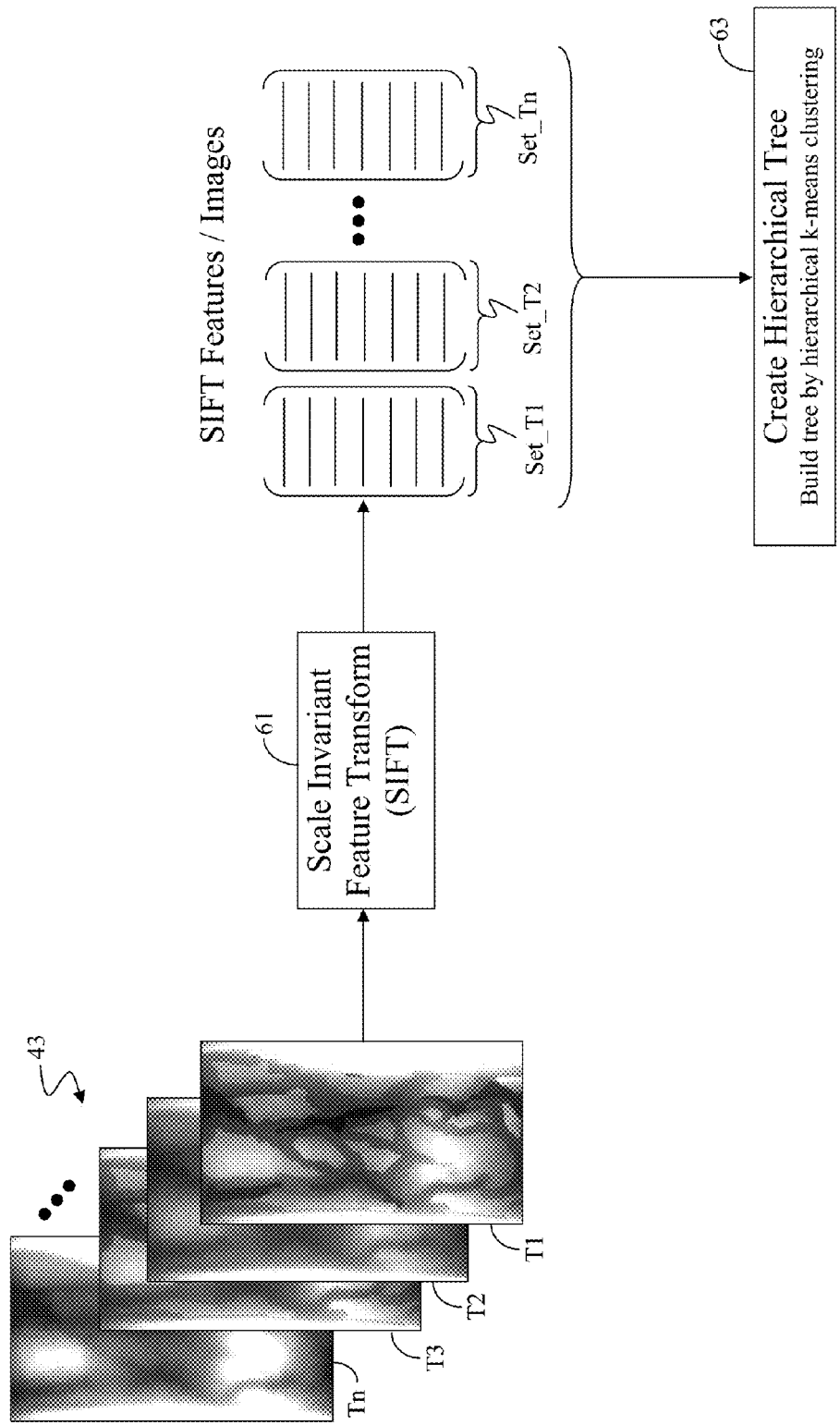
FIG. 5 illustrates the extraction and use of item descriptors (feature points) from registrants' images of a given item class.

With reference to FIG. 5, the set of biometric registration samples 49 of FIG. 4 is here used as a training library of images for construction of the hierarchical tree. For ease of discussion, the set of biometric registration samples 49 of FIG. 4 is relabeled as training library 43 in FIG. 5 since the feature point data generated in the hierarchical tree construction phase 41 may be, but are not necessarily, the same as the feature point data generated the registration/indexing phase 47.

Training library 43 consists of n training images T1 though Tn (i.e. n item samples referring to the n registration samples in the set of biometric registration samples 49), each being a true biometric image of the desired biometric type (or other item class) taken from the person who is to be registered. In the present example, the biometric type is a finger vein map; such can be obtained by means of an IR camera sensor. Each of training images T1 to Tn is submitted to an application to identify a set of item descriptors. In the present example, this is achieved by means of a scale-invariant feature transform (SIFT) processing block 61, which outputs a separate set of item descriptors (Set_T1 to Set_Tn) for each of training images T1 to Tn, respectively. Preferably, each set of item descriptors Set_T1 to Set_Tn consists of N item descriptors.

The separate sets of item descriptors Set_T1 to Set_Tn are then submitted to a Create Hierarchical Tree block/process step 63, where they are collected into a composite collection of item descriptors and organized into a hierarchical tree structure according to relations (similarities) in the item descriptors.

Figure 6:
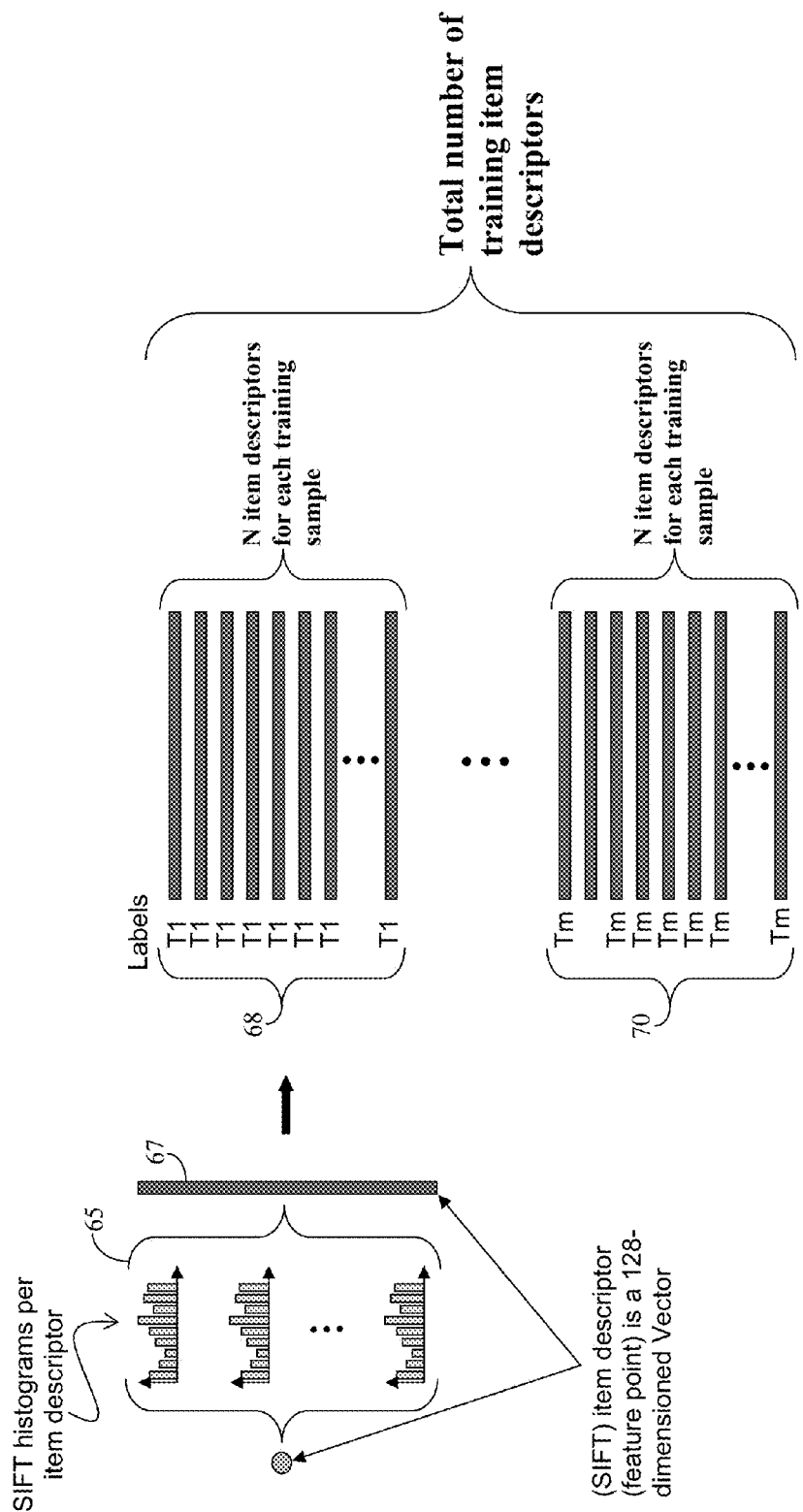
FIG. 6 illustrates the organization of item descriptors generated (feature points) using the SIFT transform.

A quick overview of SIFT block 61 is illustrated in FIG. 6. As is known in the art, a typical SIFT processing algorithm creates a series of SIFT histograms 65 to describe each identified item descriptor (or feature point or SIFT descriptor). Each of SIFT histograms 65 statistically describes a distinguishing characteristic of the item descriptor relative to a neighborhood of pixels surrounding the item descriptor in the image being processed. The series of SIFT histograms 65 are then collected into one vector 67, which constitutes one item descriptor. Each vector 67 describes an item descriptor (i.e. feature point or feature pixel) and consists of 128 pieces of descriptive data. Thus, each item descriptor (or feature pixel) is characterized by a 128-dimensioned vector 67.

The item descriptors may be labeled to identify the image from which they were extracted. In the present example, group 68, is the group (or set) of item descriptors from first training image T1, and group (or set) 70 is the group of item descriptors from the last training image Tm. The SIFT descriptors corresponding to any given training image constitutes a set of item descriptors for that training image. For example, training image T1 is shown to have a set of N item descriptors. If desired, all images may be made to have the same number of item descriptors. In this case, all training images would each have a set of N item descriptors.

In the presently preferred embodiment, all the sets of items descriptors are collected into a composite collection of item descriptors, which is then used to construct a hierarchical tree. One method of achieving this is through a recursive k-means application, as is illustrated in FIG. 7-9.

Figure 7:
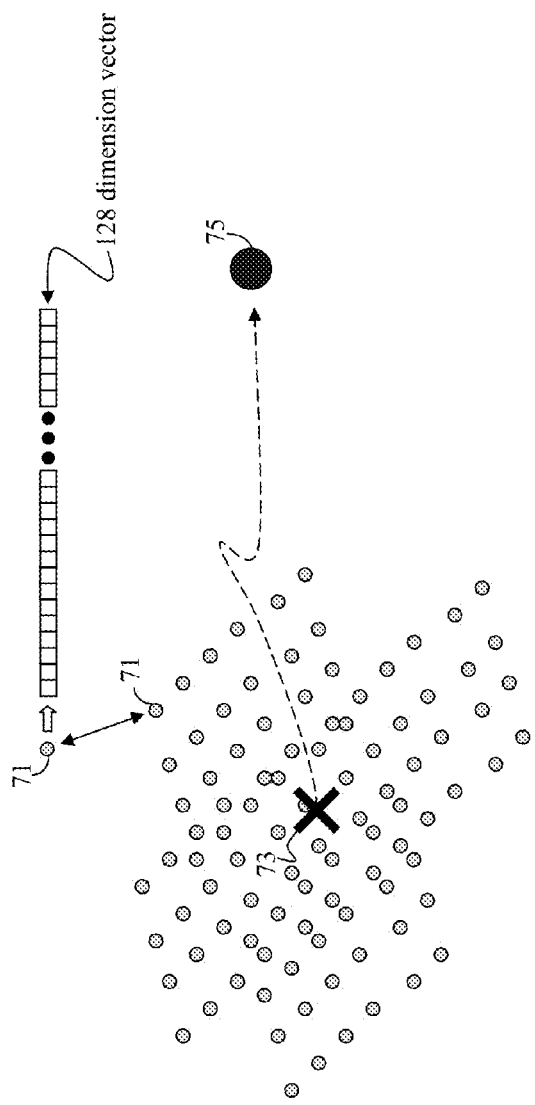
FIGS. 7 to 9 illustrate the organizing of item descriptors from the registrant's images into a hierarchical tree structure using a recursive k-means technique.

With reference to FIG. 7, although each item descriptor, such as point 71, is a 128-dimension vector, for ease of illustration a clustering of lower-dimensioned item descriptors under a single center (preferably the mean value) is shown. This mean value point 73 may define the root node 75 of the hierarchical tree that is to be constructed.

Figure 8:
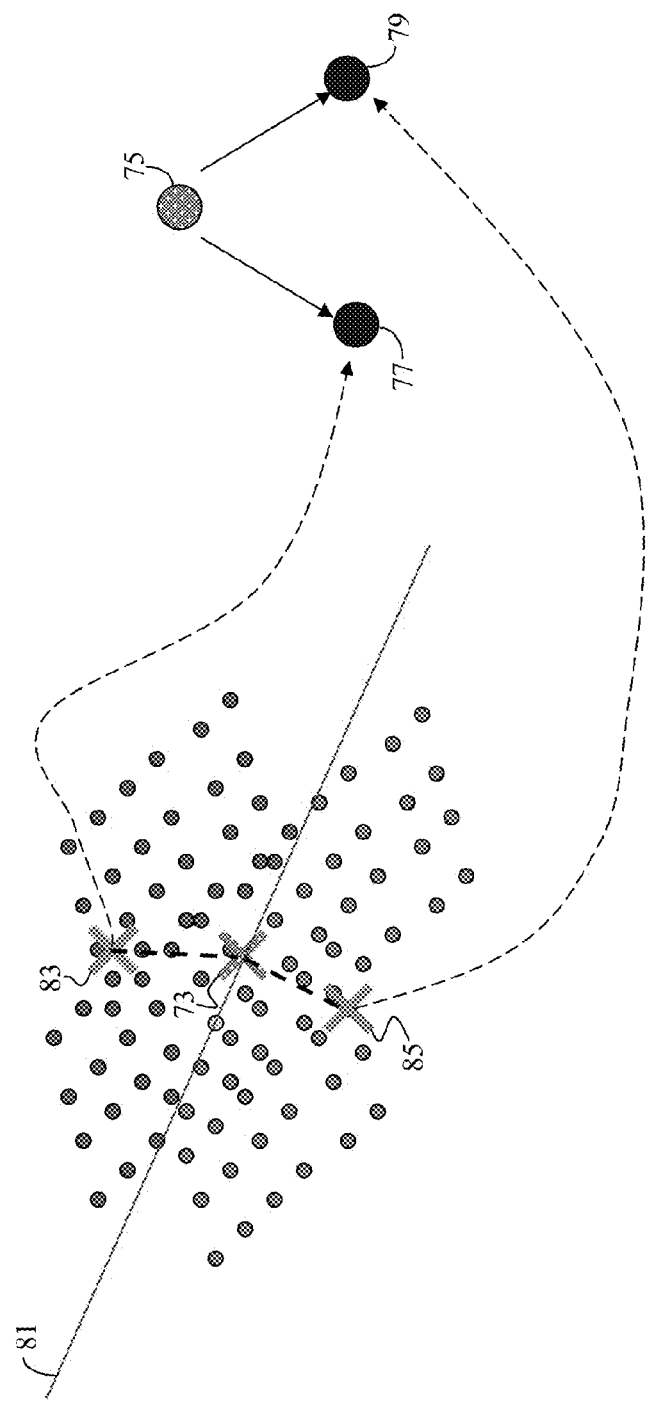
Figure 9:
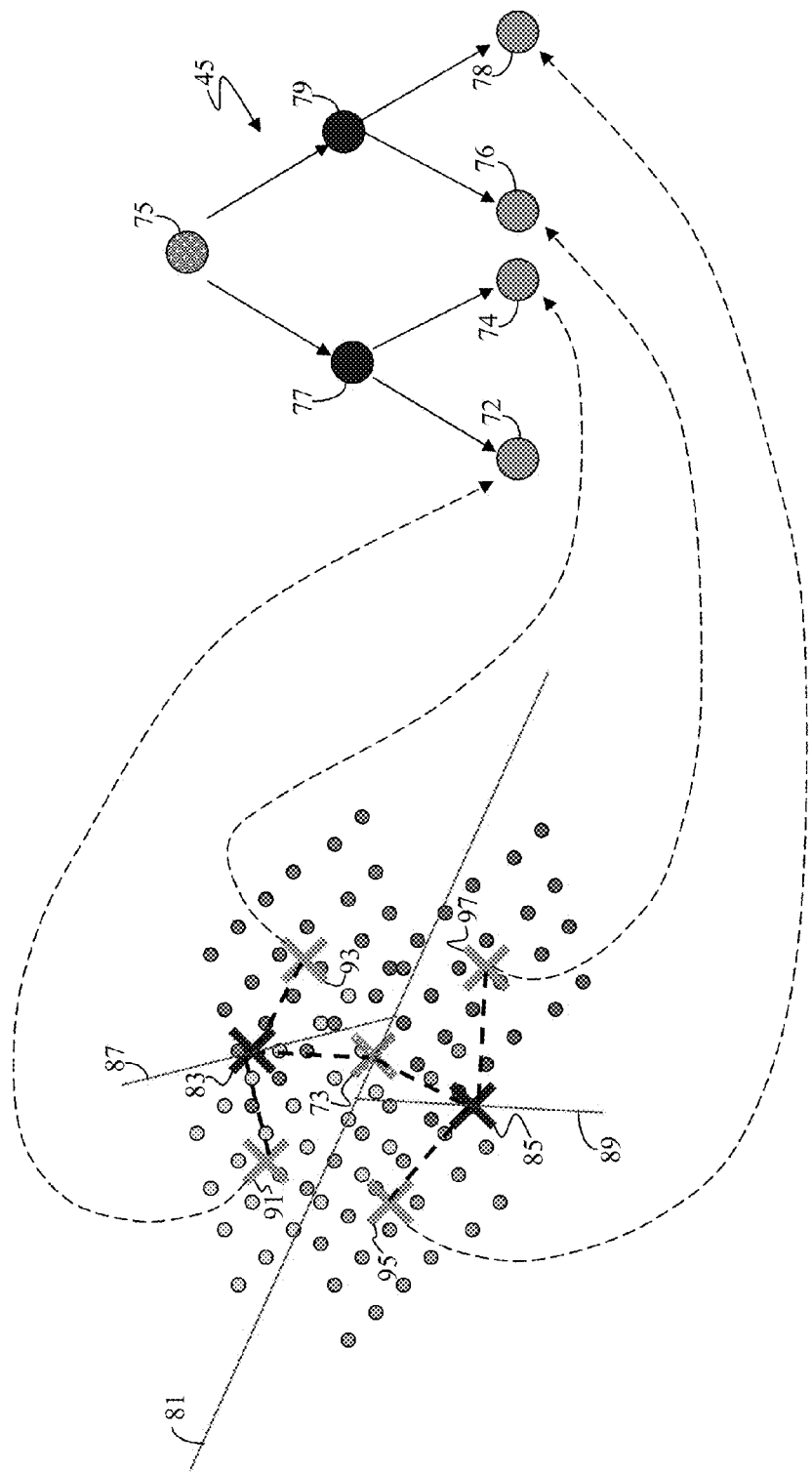

As illustrated in FIG. 8, the item descriptor data is then split into two groups (for example two substantially equal groups) along mean point 73, as illustrated by dividing line 81. This creates two new center points 83 and 85 in the two newly created groups, respectively. As before, the two new center points 83 and 85 may be the defined by the mean of their respective groups of data. Each of center points 83 and 85 may define respective child-nodes 77 and 79 under root node 75. With reference to FIG. 9, each of these two groups may then be divided along their respective center points 83 and 85, as illustrated by dividing lines 87 and 89, respectively. This results in four newly created groups of data, each of which defines a new respective center point 91, 93, 95 and 97. As before, center points 91, 93, 95 and 97 may be defined by the mean of their respective group of data. Center points 91 and 93 may define child-nodes 72 and 74 under node 77 in hierarchical tree 45, and center points 95 and 97 may define child-nodes 76 and 78 under node 79 in hierarchical tree 45. It is to be understood that the data may continue to be divided to define additional child-nodes in simplified hierarchical tree 45. For example, each group of data may continue to be divided until the distance (i.e. the difference) between data within a group is not greater than a predefined maximum.

In an hierarchical tree structure, as it is known in the art, the root node is the top-most node in the hierarchical tree, a parent node is a node that has at least one other node below it and linked to it, a child node is a node linked to a parent node above it, and a leaf node is a node with no child nodes below it. A leaf node is effectively a bottom-most node along a link path (or branch path) downward from the root node. Thus, in the example of simplified hierarchal tree 45, node 75 is the root node, nodes 77 and 79a are intermediate nodes (i.e. nodes linked to a parent node above them and linked to a child node below them), and nodes 72, 74, 76 and 68 are leaf nodes The registration/indexing phase 47 of FIG. 4 is described in more detail in FIGS. 10 to 12. For ease of discussion, the simplified hierarchical tree 45 is used to illustrate the principle of registration/indexing phase 47. Basically, users are registered by searching the training descriptor hierarchical tree 45, and recording label information (i.e. ID code) at leaf nodes that receive an item descriptor of a registration sample. The label information is preferably the identification (ID) code that identifies (i.e. is indexed to) the registration sample's corresponding person.

Figure 10:
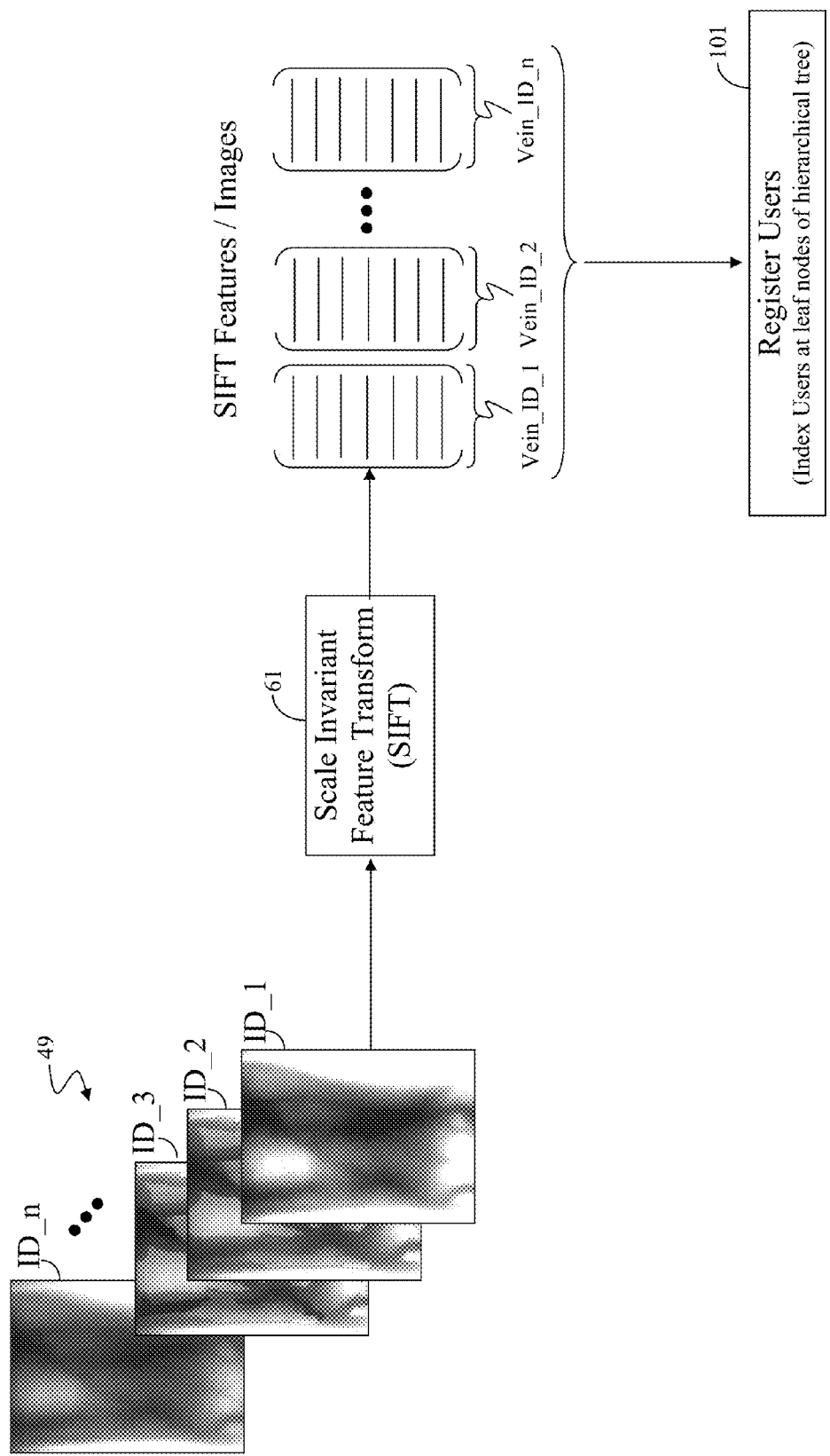
FIG. 10 illustrates the extraction and use of item descriptors from a registration library of register images corresponding to persons that are to be registered.

With reference to FIG. 10, where for ease of discussion all elements similar to those of FIG. 5 have similar reference characters and are described above, the set of biometric registration samples 49 includes at least one biometric registration sample per person that is being registered. In the present example, it is assumed that each of n persons being registered submitted one registration sample, ID_1 to ID_n, respectively. In the present example, the biometric type is a finger vein map, as is explained above in reference to training library 43. As before, each of registration samples (i.e., registration images or registrable item samples) ID_1 to ID_n is submitted to a feature identification application to identify a registrable set of item descriptors for each registration sample. Preferably, registration/indexing phase 47 uses the same feature identification application as was used in hierarchical tree construction phase 41. Thus, registration/indexing phase 47 uses a scale-invariant feature transform (SIFT) processing block, such as block 61, which outputs registrable sets of item descriptors (Vein_ID_1 to Vein_ID_n) for each of registration images ID_1 to ID_n, respectively. Preferably, each of the registrable sets of item descriptors Vein_ID_1 to Vein_ID_n consists of N item descriptors.

The registrable sets of item descriptors Vein_ID_1 to Vein_ID_n are then submitted to a Register User process step/block 101, where they are distributed into hierarchical tree 45 to create index hierarchical tree 51. Each leaf node of hierarchical tree 45 that receives any part (i.e. receives an item descriptor) of a registrable set of item descriptors also receiving the ID code (i.e. label) of the registrable item corresponding to the registrable set of item descriptors to which the received part belongs. Basically, each leaf node represents an undivided group of data, and the ID codes assigned (i.e. indexed) to a leaf indicate the identification of the registered person whose feature descriptor(s) is represented within that leaf node's corresponding group of data. The label information is preferably the identification (ID) code that identifies the registration sample's corresponding person. The result of distributing the registrable sets of item descriptors Vein_ID_1 to Vein_ID_n into hierarchical tree 45, is index hierarchical tree 51. The principle of this process of populating the leaf nodes of hierarchical tree 45 to construct registered (i.e. index) hierarchical tree 51 is illustrated in FIGS. 11 and 12.

Figure 11:
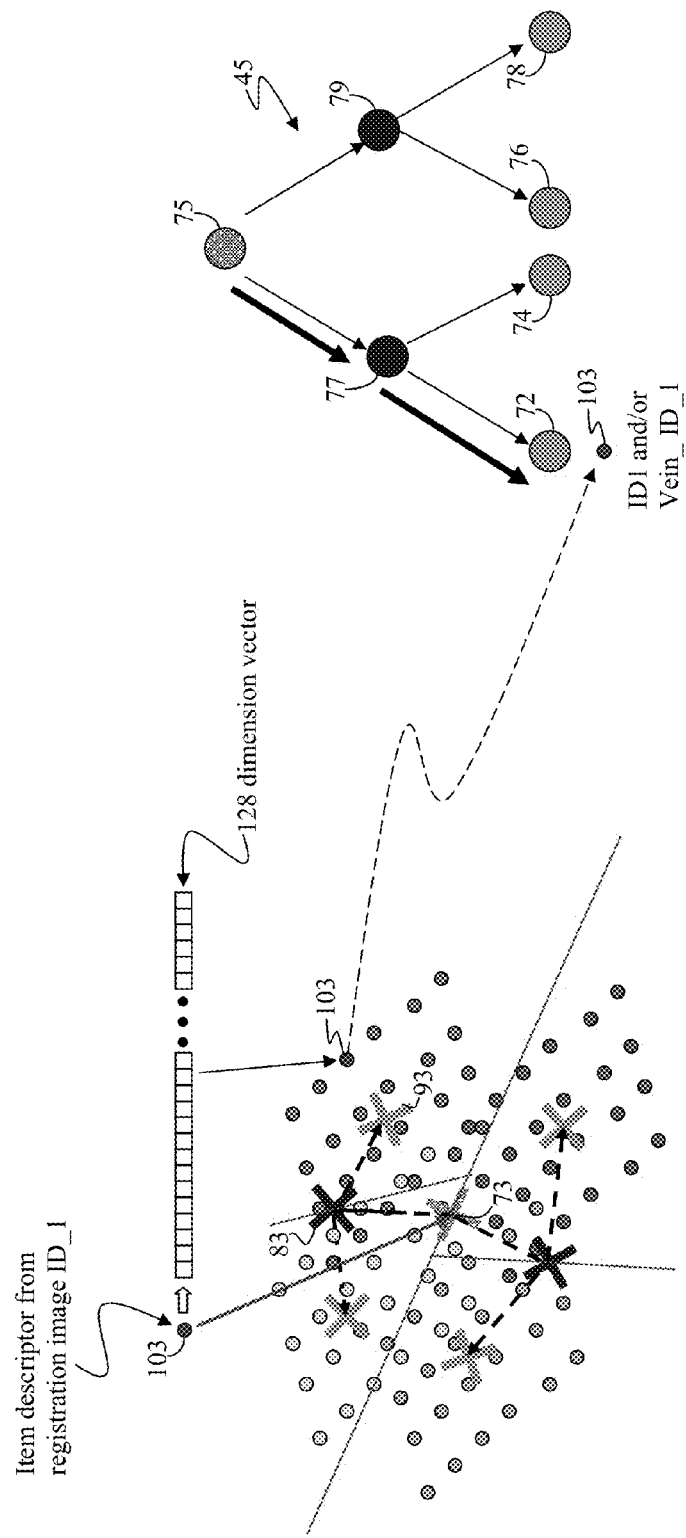
FIGS. 11 and 12 illustrate the distribution of the item descriptors from the registration library into the hierarchical tree of FIGS. 7 to 9 to create an index(ed) hierarchical tree.

With reference to FIG. 11, item descriptor 103 from registration image ID_1 is distributed into the data cluster that defined hierarchical tree 45. Like before, item descriptor 103 is a 128-dimension vector. In the present example, it is assumed that item descriptor 103 distributes/sorts into the data group defined by center point 93. As is explained above, center point 93 corresponds to leaf node 72. Consequently, item descriptor 103 is distributed to leaf node 72, and leaf node 72 is receives (is assigned or indexed to) the ID code (or label or index) of the registration image to which item descriptor 103 belongs. In the present example, the set of item descriptors that come from registration image ID_1 are labeled as Vein_ID_1, and so leaf node 72 may receive label Vein_ID_1 or label ID_1. That, leaf node 72, may receive any label that is associated with registration image ID_1, such as "Vein_ID_1" or "ID_1" or simply "ID1".

For the sake of completeness, FIG. 11 also shows that item descriptor 103 starts at center point 73, which corresponding to root node 75. Its distribution path then goes from center point 73 to the data group defined by center point 83 (corresponding to a path from root node 75 to intermediate node 77), and from center point 83 to the area defined by center point 93 (corresponding to a path from intermediate node 77 to leaf node 72). The distribution path of each item descriptor is preferably defined by similar rules that defined the data cluster of training data (i.e. recursive k-means).

Figure 12:
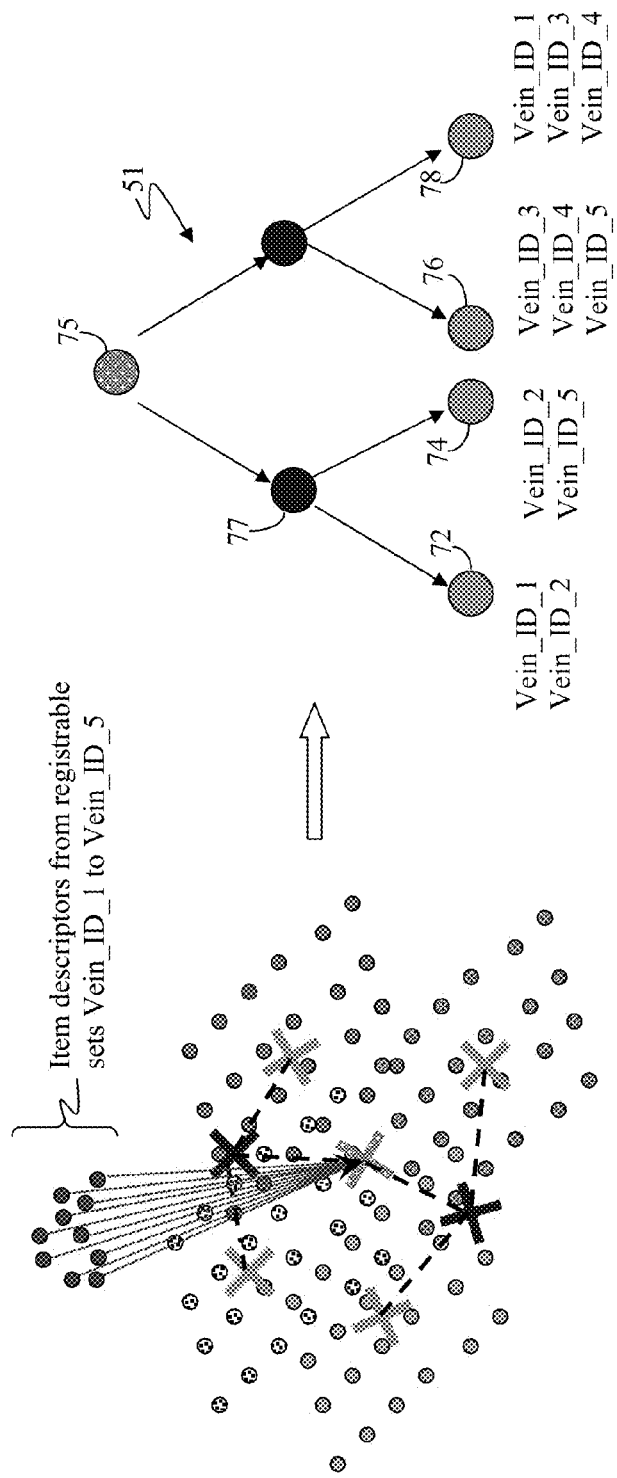

With reference for FIG. 12, the results of distributing 10 item descriptors from five registrable sets of item descriptors (labeled Vein_ID_1 to Vein_ID_5) are illustrated. This results in index hierarchical tree 51. It is to be understood that a real-world registrable set of item descriptors could have hundreds or thousands of item descriptors.

Figure 13:
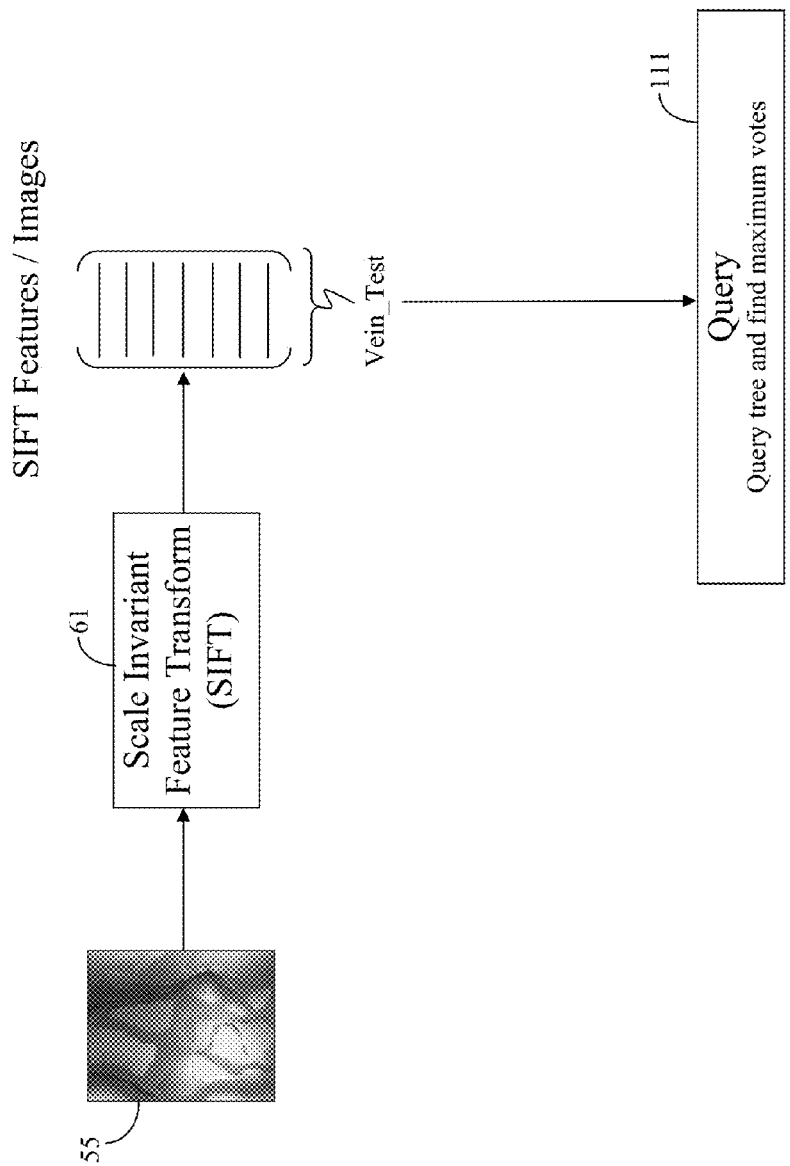
FIG. 13 illustrates the extraction and use of item descriptors from a test image of a person wishing to be identified/verified as being pre-registered.

The identification phase 53 of FIG. 4 is described in more detail in reference to FIG. 13. A test sample 55 (i.e. the specific biometric item of the given biometric item class) of a person wishing to be recognized as being pre-registered is received. In deployed systems, the IR camera sensor may be smaller than the finger resulting in only a partial vein image for querying. Thus, test sample 55 is shown to cover a smaller area than those of set of registrable samples 49.

Like before, a feature identification method, such as SIFT block 61 to identify a test set (i.e. a specific set) of test item descriptors (Vein_Test) for test sample 55. As before, each item descriptor preferably includes 128 pieces of descriptive data. Test set Vein_Test is then submitted to Register Users block 111, which distributes the item descriptors within test set Vein_Test into index hierarchical tree 51 according to the relations in the item descriptors established in the creation of hierarchical tree 45. That is, the test set of item descriptors are preferably distributed using the same data clustering technique used by training phase block 41.

Each leaf node that receives an item descriptor from test set Vein_Test, provides a vote for all the labels that reside within it (as illustrated in FIG. 12). The label (or ID code) that receives the most votes may be deemed a target ID code (or the match), since it refers to the registered person that most closely matches/resembles the test sample.

Basically, identification phase block 53 follows four steps. First, is to compute feature locations and descriptors (i.e. item descriptors) in the test image (i.e. in a new vein image). Second, is to search the index tree with each item descriptor and lookup registered labels at each encountered leaf node. Third is to accumulate votes for each label depending on the number of times the label is seen during this query process. Fourth, is to deem as the recognized user, the registered user corresponding to the label (i.e. ID vote) with the highest number of votes.

As is explained above, however, the present invention further includes verification phase 57 (shown in FIG. 4) to verify the results of identification phase 53. The verification phase can be implemented in a number of ways.

Figure 14:
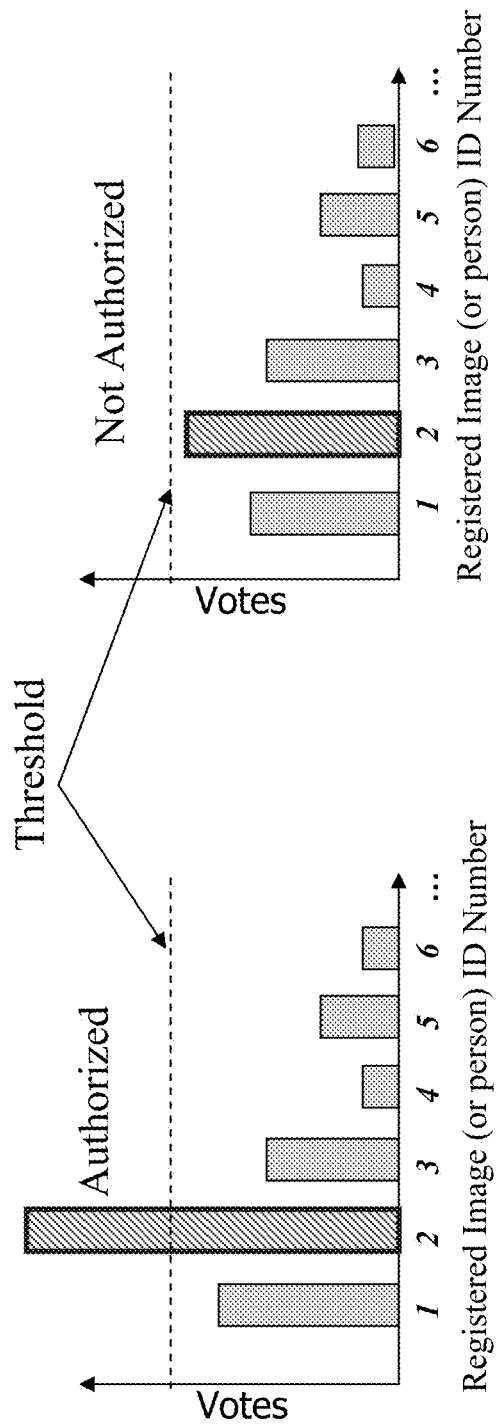
FIGS. 14-16 illustrate methods to analyze the number and distribution of votes to determine if the user is authorized.

For example with reference to FIG. 14, one method of implementing the verification phase is to analyze the number and distribution of votes to determine if the user is authorized. In this case, a threshold of minimum votes needed for verification may be established. If a the registered image that receives the most votes (i.e. image 2 in the graphs of FIG. 14) does not received enough votes to reach above the minimum threshold of volts (as illustrated in the right-most histogram in FIG. 14), then that registered image is rejected and the test image is likewise rejected as not belonging to any registered person. But if the registered image 2 does received more votes than the threshold (as illustrated by the left-most histogram in FIG. 14), then the registered image is verified, and the test image is deemed to match the registered person corresponding to registered image 2.

Figure 15:
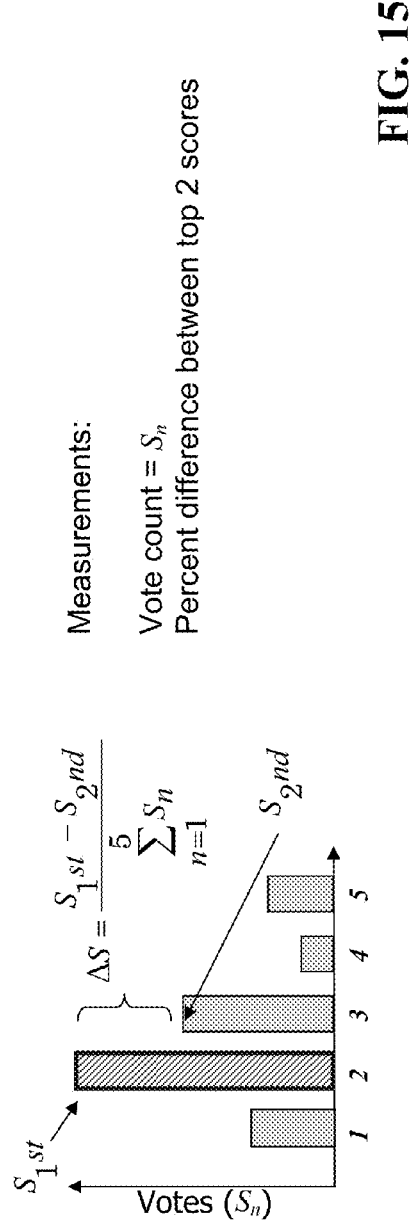
Figure 16:
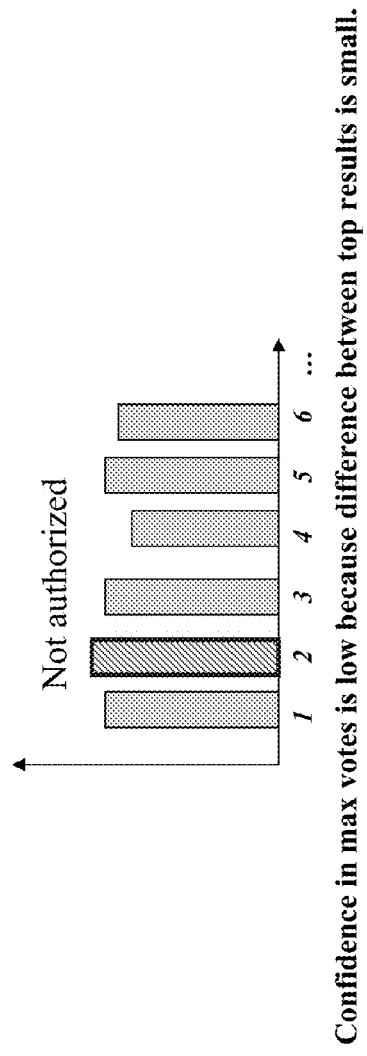

Alternatively, the difference between the top 2 returned results may be used, and its percentage of the total number of votes (or of the number of the top returned results) may be determined, as is illustrated in FIGS. 15 and 16. This approach accumulates votes and rank based on the maximum number of votes.

As is illustrated in FIG. 15, a percent difference between the top 2 scores may be computed to determine authorization. This approach can also be used to compute a confidence score. As long as the computed confidence level is above a predetermined minimum, the registered user that received the most votes can be verified. For example, in FIG. 16, the calculated confidence in the registered image that received the maximum votes is low because the difference between the top two vote-getters is small (i.e. below a predefined minimum). Consequently, the registered image of FIG. 16 is not verified as the corresponding to the test image.

Figure 17:
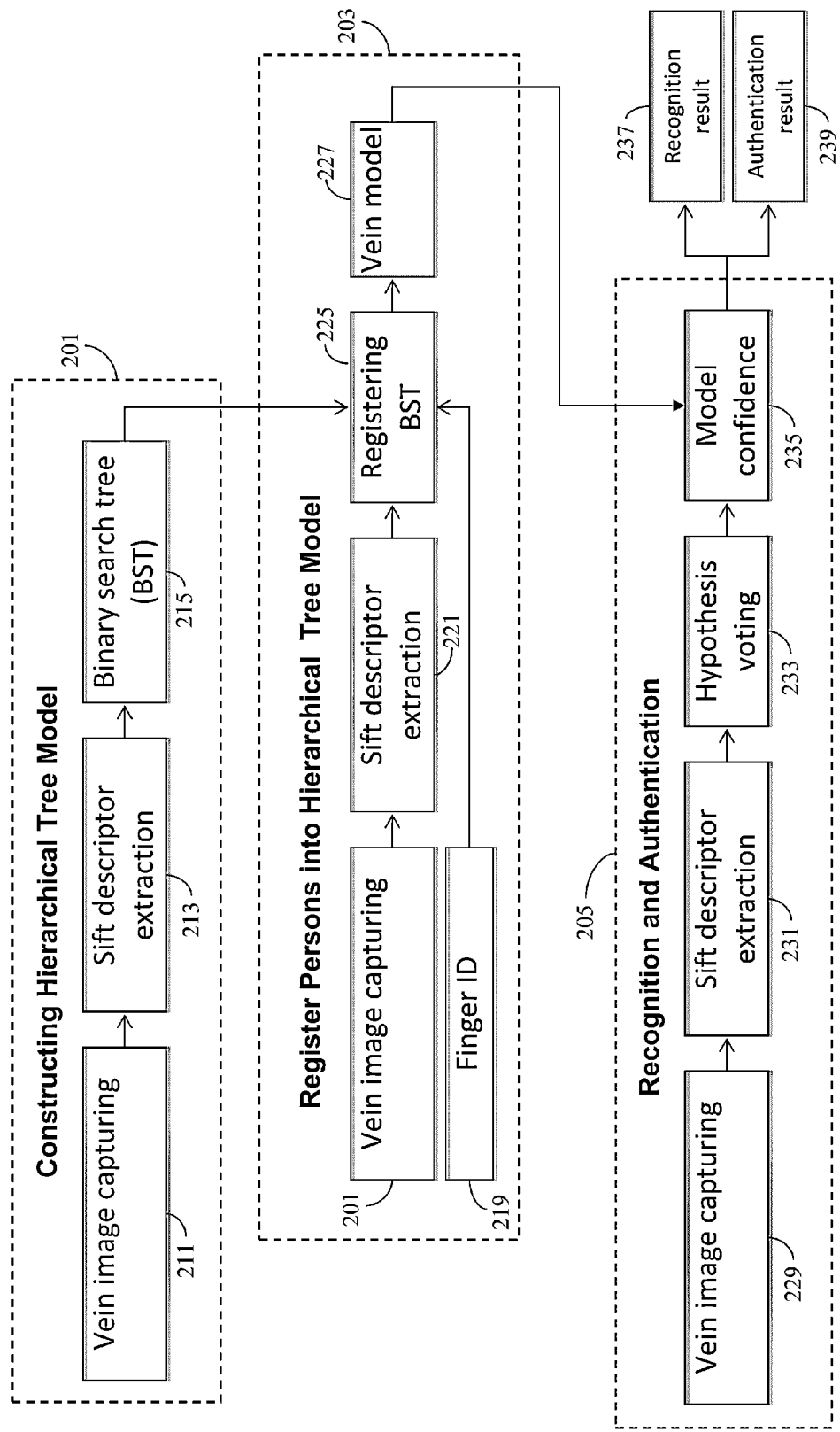
FIG. 17 is an overview of the process illustrated in FIGS. 4-16.

With reference to FIG. 17, a summary of the above-described method as implemented in a preferred embodiment is described. Block 201 describes the constructing of a hierarchical tree model from a library of biometric samples of people who are going to be registered. Block 201 coincides with blocks 41 and 49 of FIG. 4. As described before, the processing begins with Vein image capturing block 211, which produces a library of biometric registration samples of persons to be registered, such as block 49 in FIG. 4. The biometric samples are then passed on to sift descriptor extraction block 213, which produces multiple sets of feature descriptors, as is explained above in reference to FIG. 5. Block 215 then builds a hierarchical tree in a manner similar to block 63 of FIG. 5 and as described above in reference to FIGS. 6-9. In the presently preferred embodiment, block 215 creates a binary search tree.

One then proceeds to block 203 to register persons into the hierarchical tree model created in block 201 (i.e. into the hierarchical tree created in block 201). Block 203 corresponds to blocks 47 and 49 of FIG. 4. As before, the captured vein images 211 are again applied to a sift descriptor extractor 221 (like in FIG. 10, above), but the biometric ID 219 (finger (vein) ID in the preset example) is maintained for each biometric sample. As is explained above in reference to FIGS. 11 and 12, registering BST block 225 distributes the feature points from SIFT descriptor extraction block 221 into the hierarchical tree produced by block 201, and the leaf nodes that receive any part of any feature point are indexed to their corresponding finger ID. This produces Vein model 227 (i.e. produces an indexed hierarchical tree like tree 51 of FIG. 12).

One then proceeds to recognition and Authentication block 205, which corresponds to blocks 53, 55, and 57 of FIG. 4. As before, vein image capturing 229 is done of the biometric feature of the person wanting to be recognized, as was explained above in reference to block 55. The captured vein image is submitted to sift descriptor extraction block 231 to extract a set of feature points in a manner similar to that described in reference to FIG. 13. Hypotheses voting block 233 then identifies the registered person(s) who most closely matched the submitted vein image sample, such as is done by block 53. The results are submitted to model confidence block 235, which can either output the recognition results 237 as produced by block 233 or can produce authenticated results 239 if it was able to authenticate an individual registered person, such as is described in reference to FIGS. 14-16.

The above described method(s) work well for registering and identifying/authenticating registered persons, but a difficulty arises when one wants to update the registry list. Typically, adding or removing a person from the registry would require creating a new vein model of registered users. That is, it would require creating a new hierarchical tree of the new registry list and their feature points, and replacing the existing hierarchical tree with the newly created hierarchical. This poses several problems. Firstly, this would require maintaining a copy of all registered persons original biometric images (or their corresponding feature points), and this poses a security issue plus places added memory demands. Secondly is the time and computing resource required to generate a new hierarchical tree and replacing the existing one.

Below is presented a preferred method of incrementally altering an existing vein (i.e. biometric) model (i.e. an existing hierarchical tree) to accommodate a change in the registry list without requiring accessing to each registered person's original biometric image or his/her original feature point set or construction of a new hierarchical tree. The presently preferred embodiment may be incorporated into the existing registry/authentication model, as summarized in FIG. 17.

Figure 18:
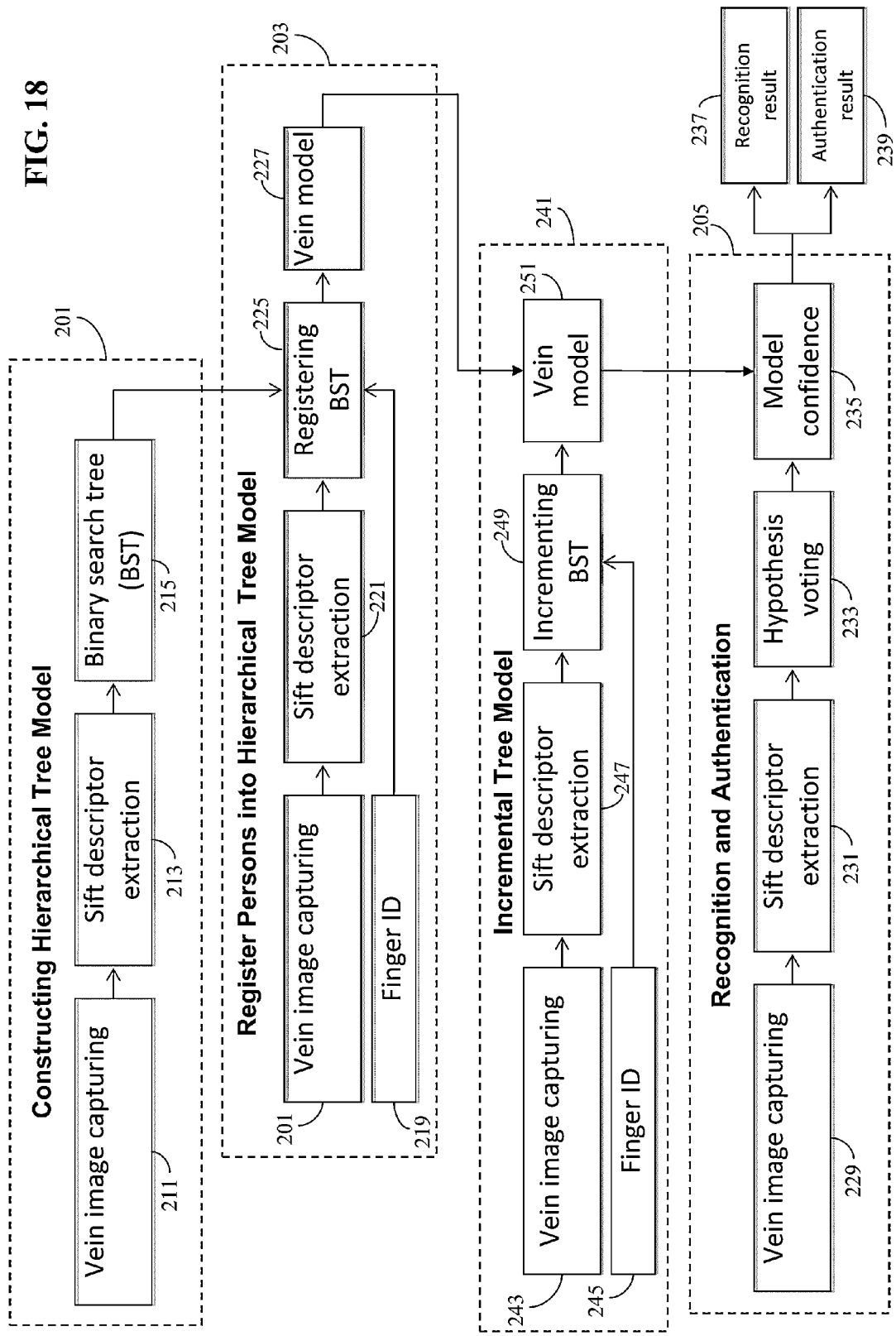
FIG. 18 introduces the present incremental tree modification method into the process of FIG. 17.

An overview of the presently preferred embodiment is summarized in FIG. 18, where all elements similar to those FIG. 17 have similar reference characters and are described above. When a new person is to be registered, a biometric sample of the new registrant (i.e. the new person to be registered) is taken. In the present example, a vein image of the new registrant is captured, as is illustrated by box 243. The new registrant's ID is also obtained, as illustrated by box 245. As before, the new vein image is submitted to a sift descriptor extraction block 247. The extracted feature points and the new finger ID 245 are submitted to an Incremental Tree processing block 249, which is described in more details below. In the present example, block 249 is an incremental binary search tree (BST). This results in a new vein model (i.e., new hierarchical tree) 251. This new vein model 251 basically amends the old vein model 227, and new vein model 251 can then be used with recognition and authentication block 205 in place of old vein model 227.

Two methods are envisioned for implementing incrementing BST block 249. The first method (i.e. Method 1) is described with reference to FIGS. 19-22, and the second method (i.e. Method 2) is described with reference to FIGS. 23-26.

Figure 20:
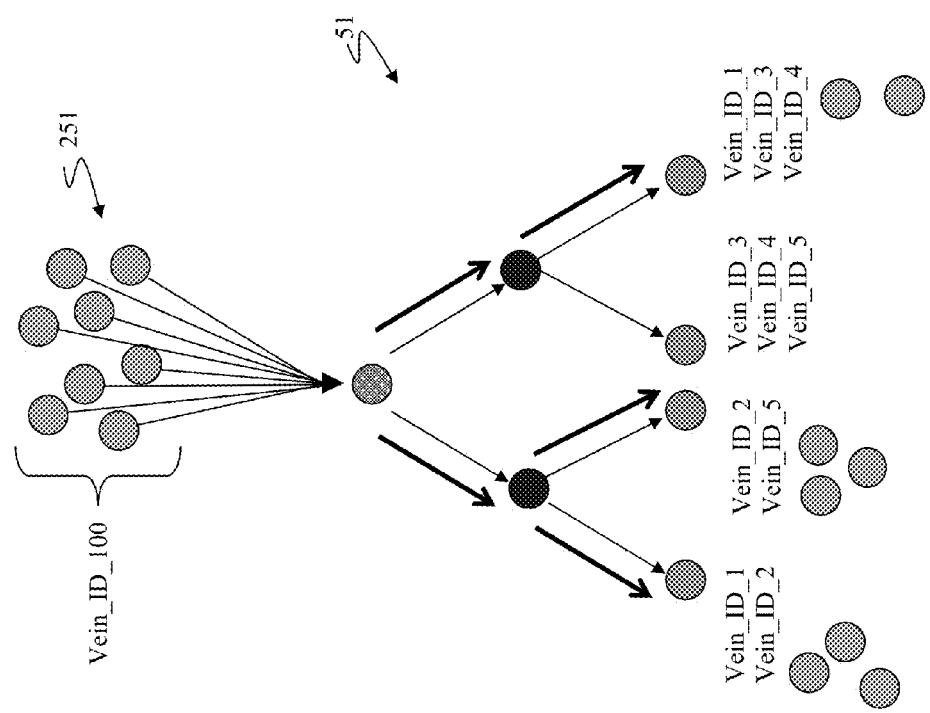
Figure 21:
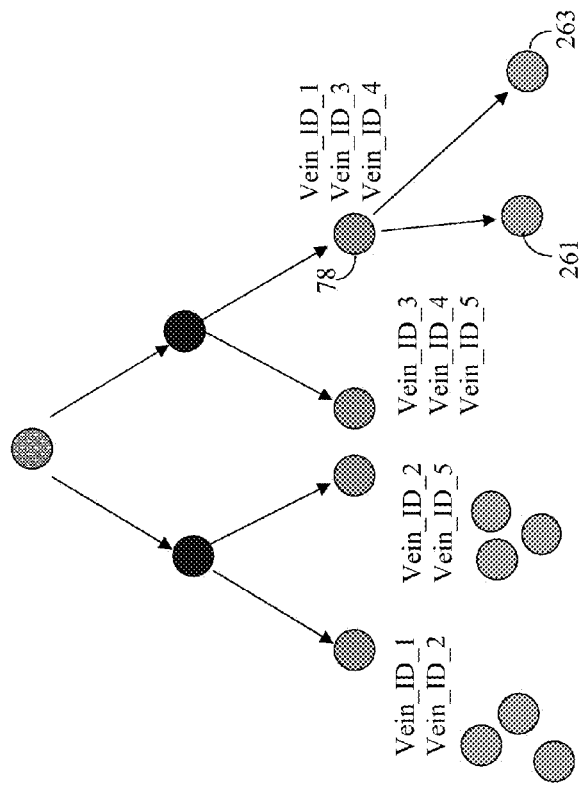
Figure 22:
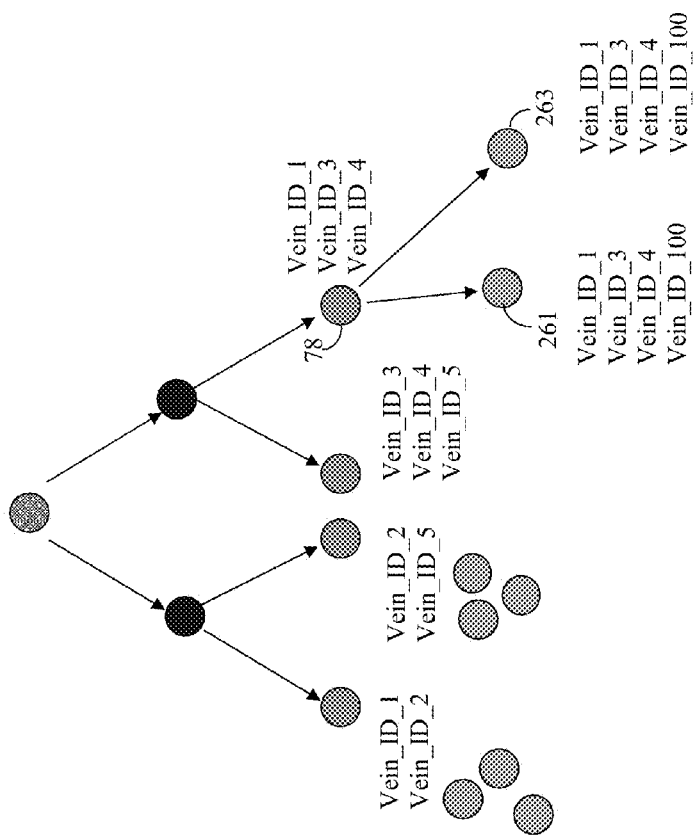

With reference to FIG. 19, method one assumes the existing vein model, i.e. an existing hierarchical tree, such as tree 51 of FIG. 12. Thus, given an existing registered hierarchical tree 51, one obtains a new set of feature descriptors 251 from a new biometric image (not shown) with corresponding new registrant's ID. In the present example, it is assumed the new registrant's ID is Vein_ID_100. As is illustrated in FIG. 20, the next step in method 1 is to cluster (i.e. distributed) each of the new feature point descriptors into the existing leaf node of the existing tree 51. With reference to FIG. 21, in the third step, for each leaf node that received a part of the new feature descriptor set (i.e. each target leaf node), if its original stopping condition is violated by the new set of feature descriptors (e.g. the max distance between any two feature descriptors is greater than a threshold), the tree's original splitting process is applied to further cluster the leaf (i.e. to create new child nodes under the existing leaf node). This is illustrated with leaf node 78, where the original leaf node 78 is made to have two more child nodes 261 and 263 below it. Finally as illustrated in FIG. 22, the finger ID list in the original leaf node 78 (i.e. the leaf index list) is duplicated to each of the new child nodes 261 and 263 (i.e. added to their respective index list), each of which may constitute a new leaf node or may be further split into additional leaf nodes as determined by the tree's original splitting process.

Figure 24:
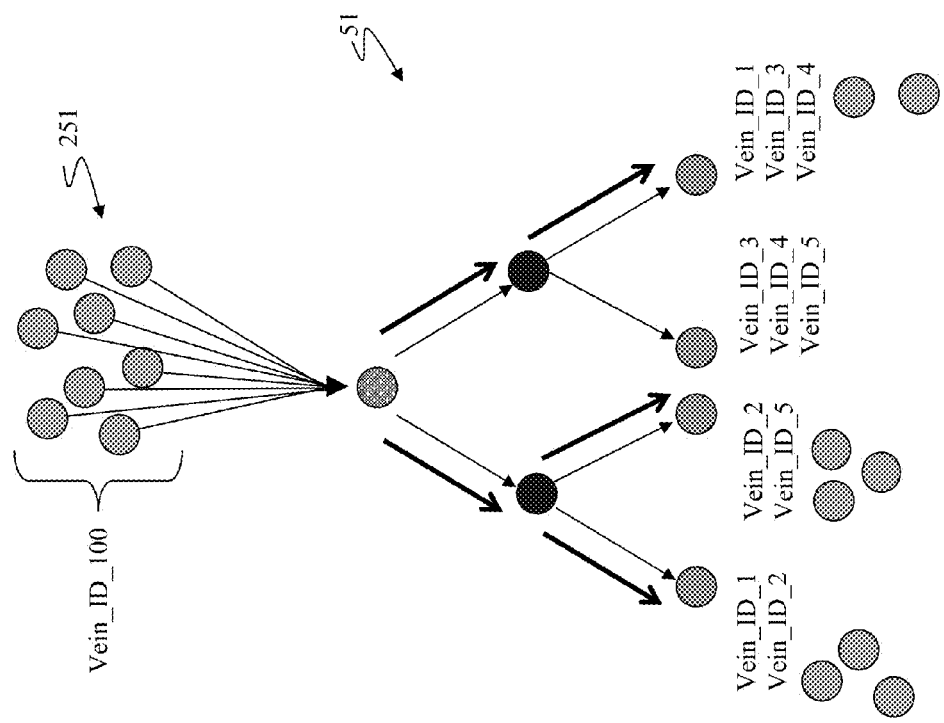
Figure 26:
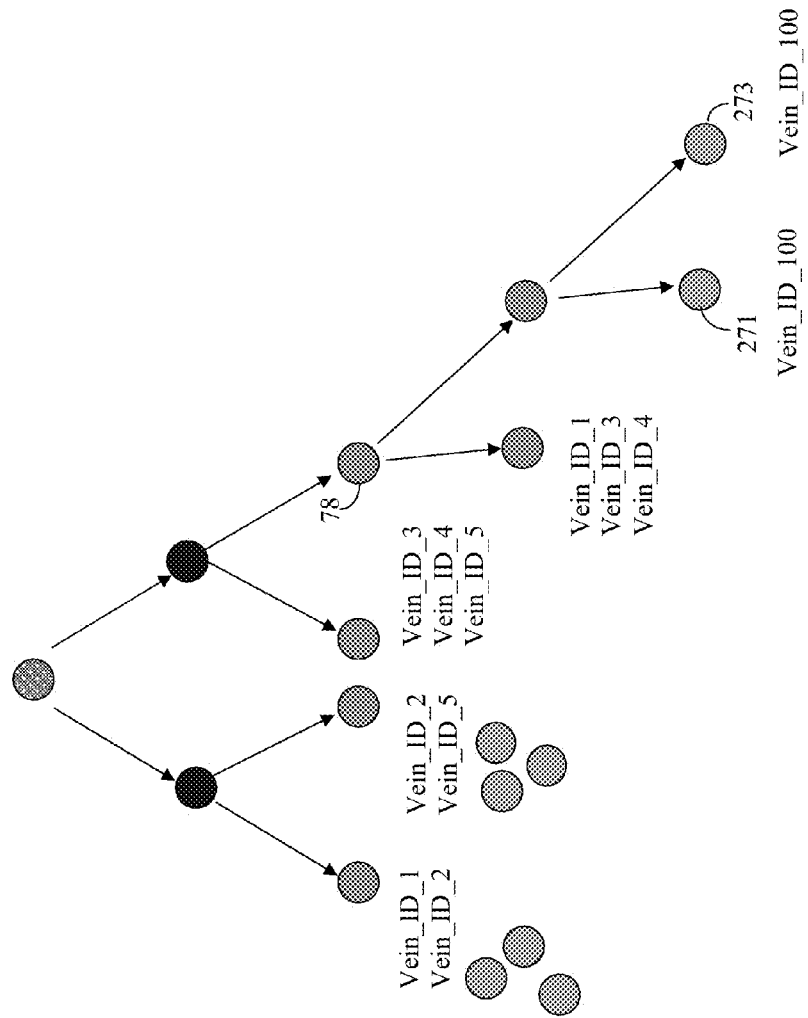

The second method (Method 2) of implementing incrementing BST block 249 is illustrated with reference to FIGS. 23-26. With reference to FIG. 23, one again assumes an existing vein model, such as hierarchical tree 51 of FIG. 12. Thus, given an existing registered hierarchical tree 51, one obtains a new set of feature descriptors 251 from a new biometric image (not shown) with corresponding new registrant's ID. In the present example, it is assumed the new registrant's ID is Vein_ID_100. The second step Method 2 is similar to that of Method 1, as is illustrated in FIG. 24. Like before, each of the new feature descriptors are clustered (i.e. distributed) into an appropriate leaf node in the pre-existing tree 51. With reference to FIG. 25, in step 3, for each leaf node that received a new feature descriptor (i.e. each target leaf node), the leaf node is split into two child nodes creating a sub-leaf-node_1 and a sub_leaf_node_2. Sub_leaf_node_1 is made a duplicate of the original leaf 78 prior to receiving any of the new set of feature descriptors, and sub_leaf_node_2 receives all the new feature descriptors and any descriptor that violates the original stopping condition of the original leaf node 78 (e.g. the max distance to the original center is greater than twice the threshold). Preferably, sub_leaf_node_2 does not receive a copy of the leaf index list of the target leaf node. Lastly in step 4, a splitting process (such as the original splitting process) is applied to sub_leaf_node_2 (and preferably not to sub_leaf_node 1) to further cluster (i.e. split) sub_leaf_node_2, resulting in two new leaf nodes 271 and 273, as is illustrated in FIG. 26.

Figure 27:
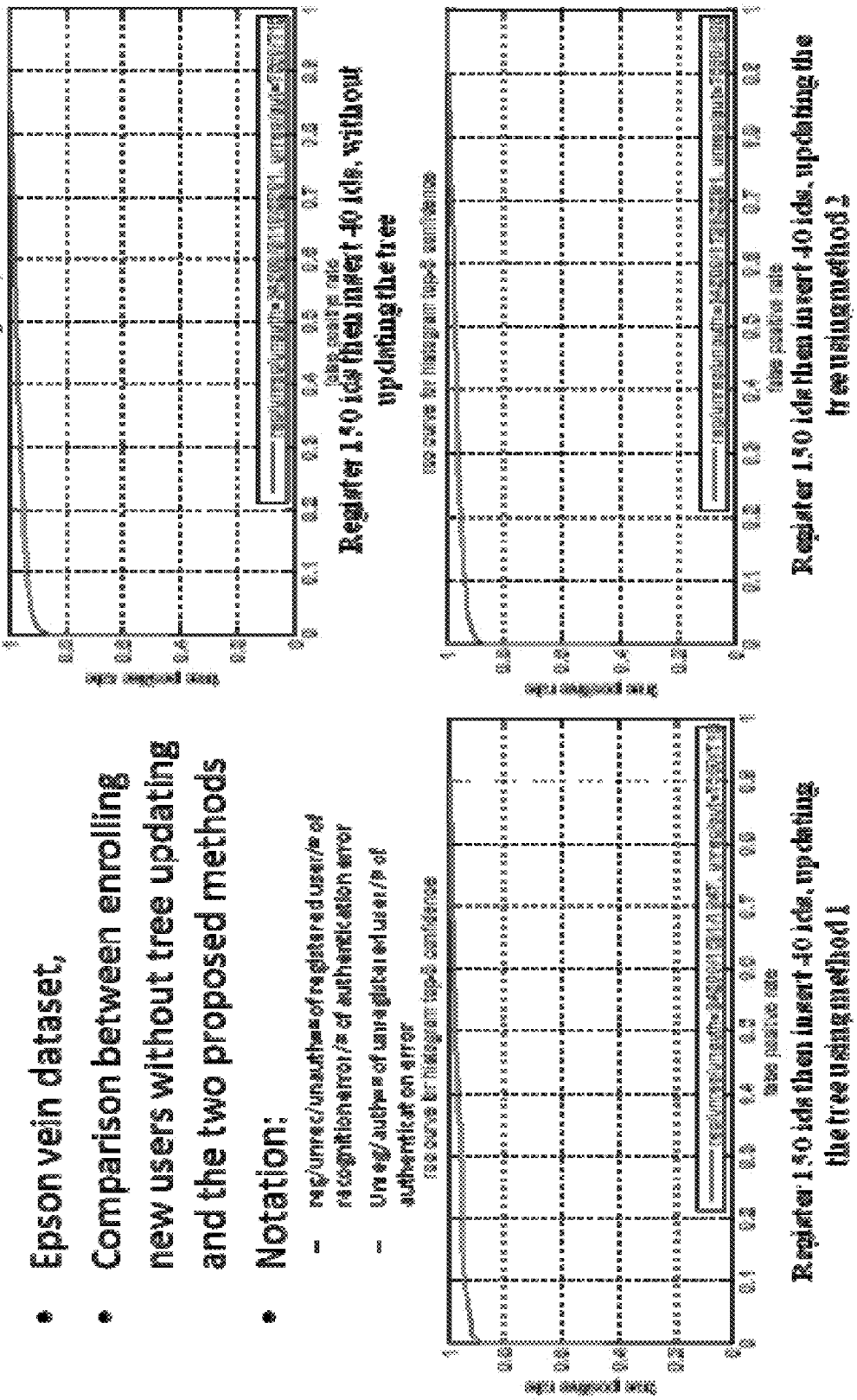
FIG. 27 compares the results of methods 1 and 2 of incremental tree modification with an approach does not implement incremental tree modification.

FIG. 27 provides a comparison of the traditional method of reconstructing a new hierarchical tree every time a change to list registration list is made versus Method 1 and Method 2 of incrementally adjusting a pre-existing hierarchical tree. In each of these cases, an original list of 150 registrants is used, and to this list, 40 new registrants are added. In the example where no incremental tree method is applied, the (number of registered users/number of recognition errors/number of authentication error) was (34200/3110/2201). The (number of unregistered users/number of authentication error) was (7560/715). For the case of a incremental tree model construction using Method 1, the (number of registered users/number of recognition errors/number of authentication error) was (34200/1531/1947), and the (number of unregistered users/number of authentication error) was (7560/718). Lastly, the case of the incremental tree model using Method 2 achieved (34200/1725/2291) for the (number of registered users/number of recognition errors/number of authentication error), and achieved (7560/608) for the (number of unregistered users/number of authentication error). Thus, both Method 1 and Method 2 compared well with the case where no incremental tree was used.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of creating an updatable search tree identifying a specific item within an item class, said method comprising the following steps:
   (a) accessing a collection of unique registrable item samples belonging to said item class, each registrable item sample being a representation of a different target item and having a unique identification (ID) code identifying its corresponding target item;
   (b) identifying a, separate and corresponding, registrable set of item descriptors for each of said registrable item samples;
   (c) creating a composite collection of item descriptors from the separate registrable sets of item descriptors;
   (d) organizing said composite collection of item descriptors into a hierarchical tree structure according to relations in the item descriptors, all item descriptors of the composite collection being further included into the determined leaf nodes of said hierarchical tree, each leaf node of said hierarchical tree being indexed according to its leaf index list, said leaf index list being comprised of the ID's of the target items corresponding to the item descriptors within the leaf node, wherein every leaf node is a bottom-most node of a branch in said hierarchical tree;

(e) accessing a new registrable item having a unique identification (ID) code identifying its corresponding target item;

(f) identifying a new registrable set of item descriptors for said new registrable item;

(g) distributing all the item descriptors in the new registrable set of item descriptors into the leaf nodes of said hierarchical tree according to said relations in the item descriptors by which said hierarchical tree is organized, each leaf node of said hierarchical tree that receives any part of said new registrable set of item descriptors being a target leaf node, and each target leaf node being subjected to an incremental tree modification of said hierarchical tree using only the item descriptors within the target leaf node, said incremental tree modification creating at least two additional child nodes under said target leaf node, each of said additional child nodes being indexed to the ID's on its index list, said index list including at least the IDs of the target items corresponding to the item descriptors within it, the resultant modified hierarchical tree being said updatable search tree.

2. The method of claim 1, wherein step (c) includes eliminating said separate registrable sets from use in any subsequent method step.

3. The method of claim 1, wherein said step (b) includes destroying said registrable item samples after creation of said registrable set of item descriptors to eliminate use of said registrable item samples from any subsequent method step.

4. The method of claim 1, wherein said incremental tree modification includes:
(i) for each target leaf node, if its original stopping condition is violated by the new registrable set of item descriptors, the hierarchical tree's original splitting process is applied to the target leaf node to create said additional child nodes under the existing target leaf node; and
(ii) the leaf index ID list in the target leaf node is duplicated in the index list of each of said additional child nodes.

5. The method of claim 4, further including after step (ii):
(iii) any of said additional child nodes that violates the original stopping condition is further split into additional new child nodes as determined by the tree's original splitting process and the leaf index ID list in the target leaf node is duplicated in each of the index lists of the additional new child nodes.

6. The method of claim 4, wherein the hierarchical tree's original splitting process is based on whether the maximum distance between any two feature descriptors is greater than a predefined threshold.

7. The method of claim 1, wherein said incremental tree modification includes:
(I) for each target leaf node, the target leaf node is split into two child nodes creating a sub-leaf-node_1 and a sub_leaf_node_2;
(II) sub_leaf_node_1 is made a duplicate of the target leaf node prior to receiving any of the new registrable set of item descriptors; and
(III) sub_leaf_node_2 receives only new registrable set of item descriptors that were clustered within the target leaf node and any other descriptor that violates the original stopping condition of the target leaf node;

(IV) applying a splitting process to sub_leaf_node_2 to further cluster sub_leaf_node_2, resulting in two new additional leaf nodes under sub_leaf_node_2.

8. The method of claim 7, wherein in step (IV), the splitting process is not applied to sub_leaf_node_1.

9. The method of claim 7, wherein in step (IV), the splitting process is the hierarchical tree's original splitting process.

10. The method of claim 7, wherein the sub_leaf_node_2 omits a duplication of the leaf index list of the target leaf node.

11. The method of claim 1, further including after step (g):
(h) identifying a specific one of the unique registrable items by obtaining a new sample of said unique registrable item, identifying a new set of item descriptors for the new sample, distributing said new set of item descriptors into said hierarchical tree according to said relations in the item descriptors by which said hierarchical tree is organized, noting the ID codes of the leaf nodes that receive any part of said new set of item descriptors, identifying the ID code that is noted most often as a target ID code; and
(i) identifying as said specific one of the unique registrable items, the registrable item corresponding to said target ID code.

12. A method of incremental hierarchical tree modification, comprising:
(a) accessing an indexed hierarchical tree wherein each leaf node is indexed to a set of ID's identifying all items represented by any one of a collection of data within the leaf node, the ID's represented by each leaf node constituting an index list of the leaf node, said hierarchical tree being organized by pre-defined data relations among the data clustered within the hierarchical tree, all item descriptors of the collection of data being further included into the leaf nodes of said hierarchical tree, each of said leaf node being a bottom-most node in the indexed hierarchical tree;
(b) accessing a new registrable item having a unique identification (ID) code identifying its corresponding target item, said unique ID not being represented by any ID list of any leaf node of said hierarchical tree;
(c) identifying a new registrable set of item descriptors for said new registrable item;
(d) distributing all of the new registrable set of item descriptors into said hierarchical tree according to said data relations by which said hierarchical tree is organized, each leaf node of said hierarchical tree that receives any part of said new registrable set of item descriptors being a target leaf node, and each target leaf node being subjected to an incremental tree modification of said hierarchical tree using only the item descriptors within the target leaf node, said incremental tree modification creating at least two additional child nodes under said target leaf node, each of said additional child nodes being indexed to the ID's on its index list, said index list including at least the IDs of the target items corresponding to the item descriptors within it.

13. The method of claim 12, wherein said incremental tree modification includes:
(i) for each target leaf node, if its original stopping condition is violated by the new registrable set of item descriptors, the hierarchical tree's original splitting process is applied to the target leaf node to create said additional child nodes under the existing target leaf node; and (ii) the leaf index ID list in the target leaf node is duplicated in the index list of each of said additional child nodes.

14. The method of claim 13, further including after step (ii):
(iii) any of said additional child nodes that violates the original stopping condition is further split into additional new child nodes as determined by the tree's original splitting process and the leaf index ID list in the target leaf node is duplicated in each of the index lists of the additional new child nodes.

15. The method of claim 13, wherein the hierarchical tree's original splitting process is based on whether the maximum distance between any two pieces of data is greater than a predefined threshold.

16. The method of claim 12, wherein said incremental tree modification includes:
(I) for each target leaf node, the target leaf node is split into two child nodes creating a sub-leaf-node_1 and a sub_leaf_node_2;
(II) sub_leaf_node_1 is made a duplicate of the target leaf node prior to receiving any of the new registrable set of item descriptors; and
(III) sub_leaf_node_2 receives only new registrable set of item descriptors that were clustered within the target leaf node and any other descriptor that violates the original stopping condition of the target leaf node;
(IV) applying a splitting process to sub_leaf_node_2 to further cluster sub_leaf_node_2, resulting in two new additional leaf nodes under sub_leaf_node_2.

17. The method of claim 16, wherein in step (IV), the splitting process is not applied to sub_leaf_node_1.

18. The method of claim 16, wherein in step (IV), the splitting process is the hierarchical tree's original splitting process.

19. The method of claim 16, wherein the sub_leaf_node_2 omits a duplication of the leaf index list of the target leaf node.

20. The method of claim 1, wherein in step (c), the composite collection includes all the item descriptors from all the separate registrable sets of item descriptors, and the hierarchical tree is organized using all the items descriptors in the composite collection.

* * * * *